United States Patent [19]
Sakagami et al.

[11] Patent Number: 5,936,943
[45] Date of Patent: Aug. 10, 1999

[54] LINE INTERFACE EQUIPMENT IN ATM EXCHANGE

[75] Inventors: Kenji Sakagami; Isamu Ishikawa; Satoshi Kawano, all of Sendai, Japan

[73] Assignee: Fujitsu Limited, Kanagawa, Japan

[21] Appl. No.: 08/736,811

[22] Filed: Oct. 25, 1996

[30] Foreign Application Priority Data

Jan. 26, 1996 [JP] Japan ..................................... 8-012024

[51] Int. Cl.⁶ ....................................................... H04J 3/14
[52] U.S. Cl. ......................... 370/244; 370/395; 370/253; 370/410
[58] Field of Search .................................. 370/219, 232, 370/233, 243, 244, 253, 395, 397, 398, 410, 528

[56] References Cited

U.S. PATENT DOCUMENTS

| | | | |
|---|---|---|---|
| 5,153,578 | 10/1992 | Izawa et al. | 340/825.41 |
| 5,283,782 | 2/1994 | Takase et al. | 370/398 |
| 5,640,512 | 6/1997 | Czerwiec | 395/200.01 |
| 5,659,540 | 8/1997 | Chen et al. | 370/249 |
| 5,661,722 | 8/1997 | Miyagi | 370/235 |
| 5,671,578 | 9/1997 | Kurano | 370/218 |
| 5,715,237 | 2/1998 | Akiyoshi | 370/232 |
| 5,717,858 | 2/1998 | Shtayer et al. | 370/229 |
| 5,822,298 | 10/1998 | Matsumoto et al. | 370/235 |

FOREIGN PATENT DOCUMENTS

| | | |
|---|---|---|
| 4284754 | 10/1992 | Japan . |
| 750676 | 2/1995 | Japan . |

*Primary Examiner*—Chi H. Pham
*Assistant Examiner*—Frank Duong
*Attorney, Agent, or Firm*—Helfgott & Karas, PC.

[57] ABSTRACT

A state managing unit inside a line interface performs communication with a processor of both information concerning the starting and stopping of performance monitoring, and information concerning the monitoring. After entering into the state starting the monitoring, the managing unit manages by itself the state of progress of the monitoring of the performance, which state is changed by successively performing communications of OAM cells with an opposing ATM exchange, and thus autonomously executing the processing without intervention of the processor. The load on the processor is reduced and a high speed communication interface becomes unnecessary.

7 Claims, 35 Drawing Sheets

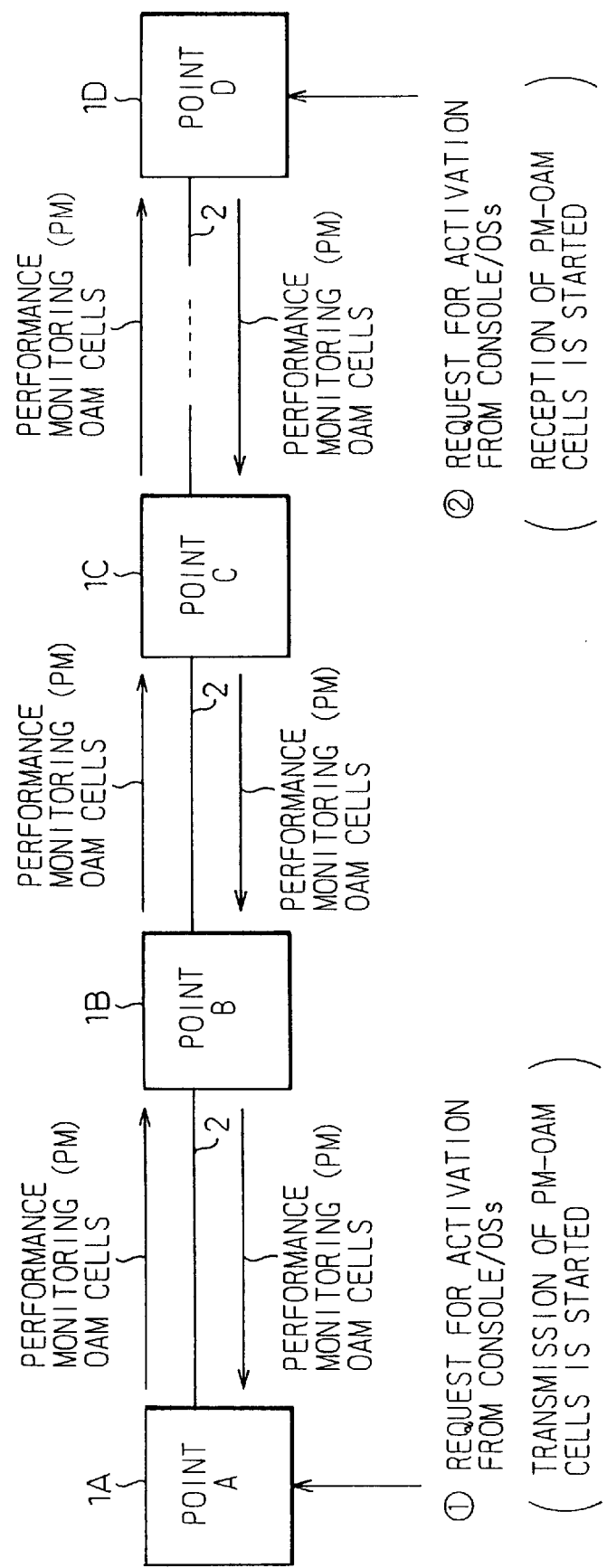

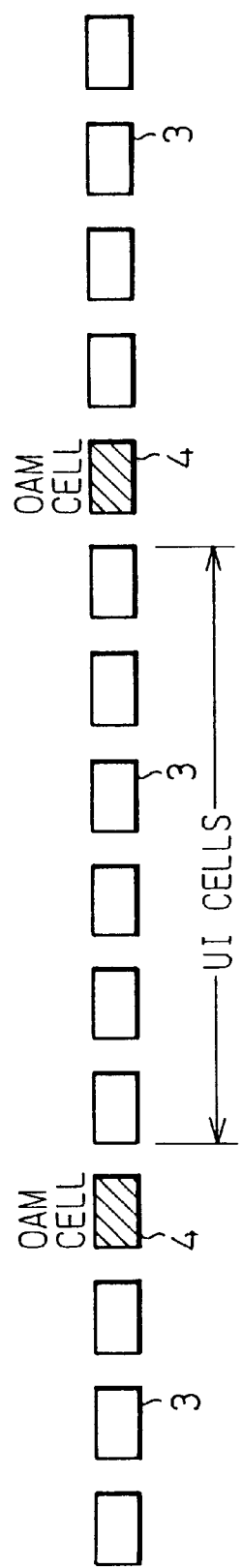

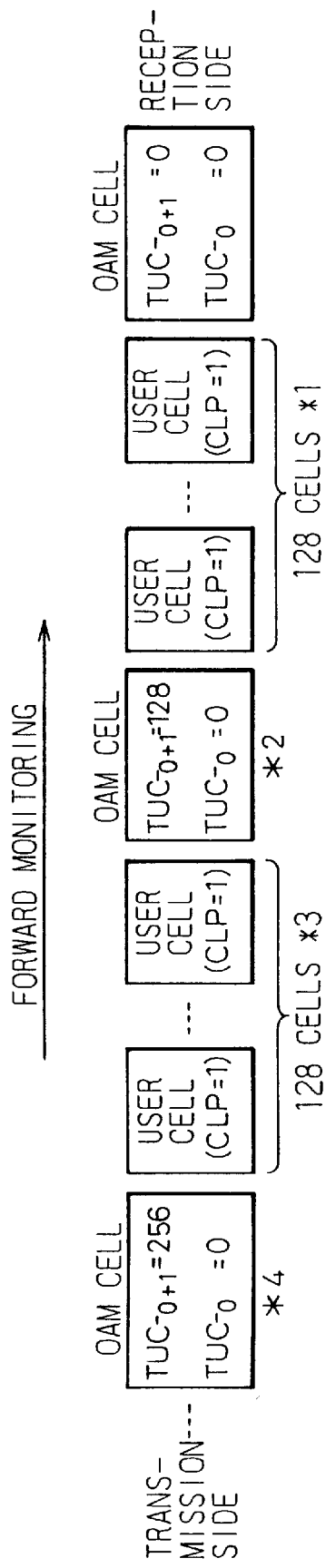

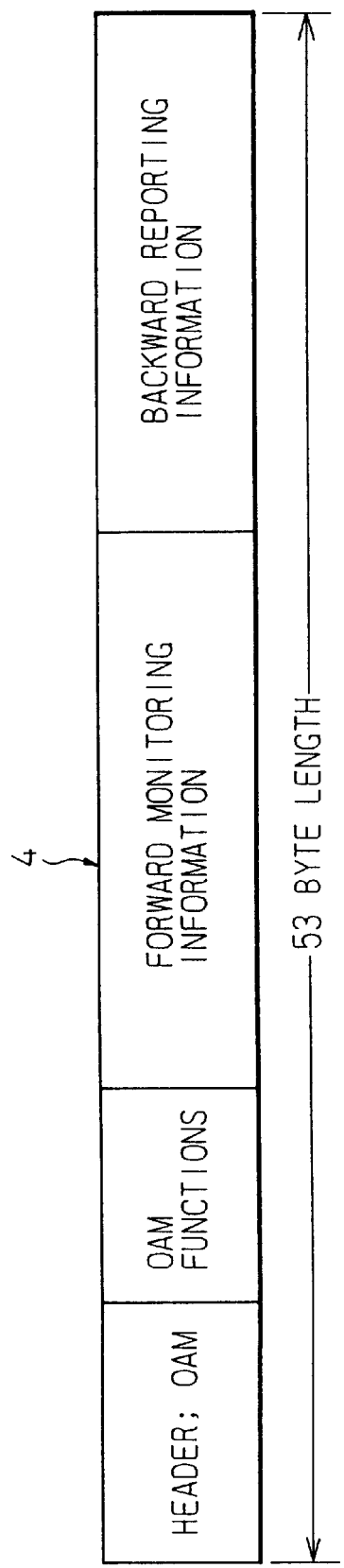

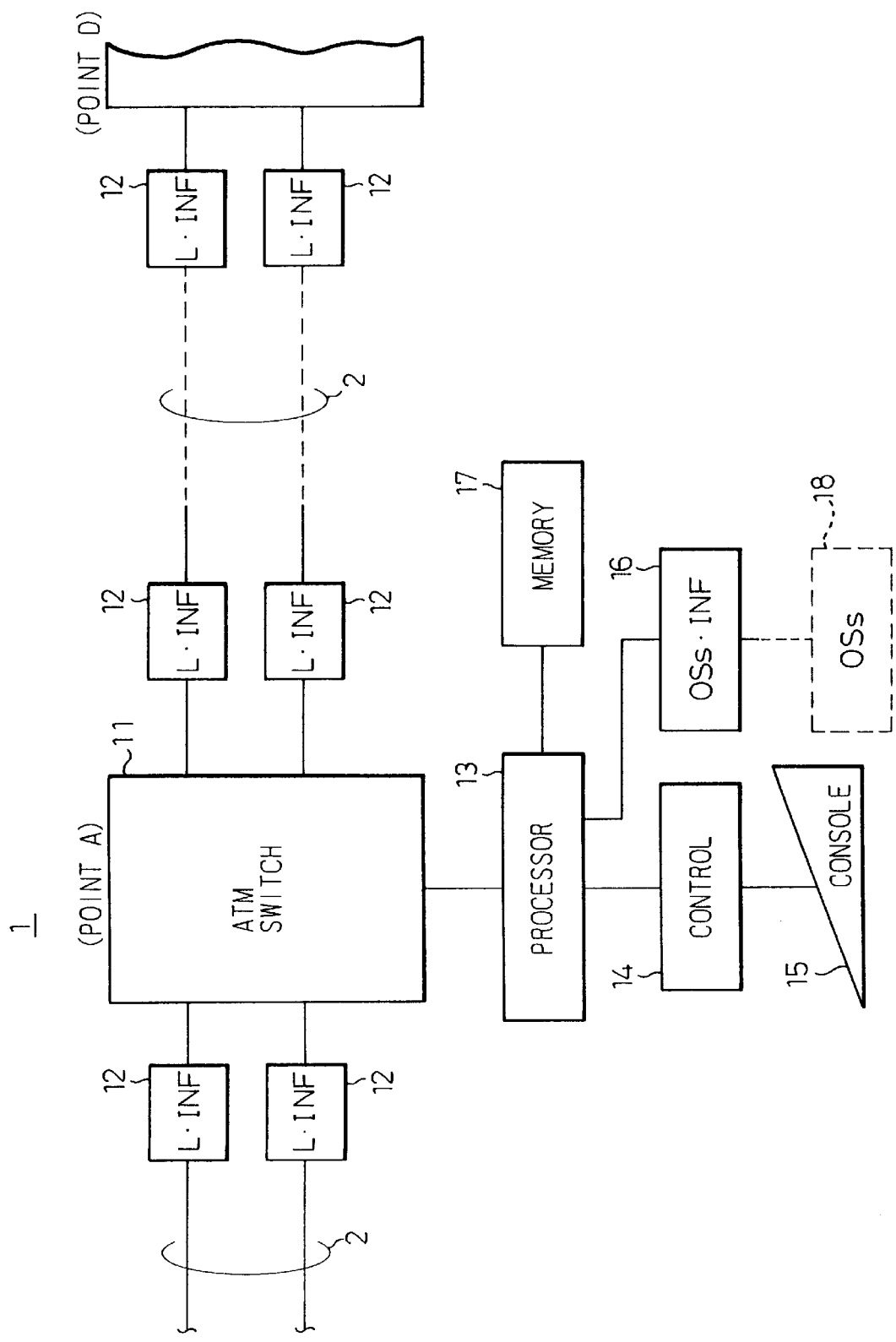

LINE INTERFACE EQUIPMENT IN ATM EXCHANGE

BACKGROUND OF THE INVENTION

1. Field of the Invention

The present invention relates to a performance monitoring facility in an asynchronous transfer mode (ATM) switching system, more particularly relates to line interface equipment in an ATM exchange.

An ATM switching system consists of a plurality of ATM exchanges connected for example in cascade via lines. In such an ATM switching system, for improvement of the reliability of the system, the performance, i.e., the transmission quality of each line, has been monitored by running monitoring cells of fixed lengths along the lines.

The present invention is directed to a monitoring facility in an ATM switching system for performing the above-mentioned monitoring operation.

2. Description of the Related Art

As will be explained in detail later with reference to the attached drawings, an ATM switching system to which the present invention is applied comprises a plurality of ATM exchanges and lines connecting them in cascade. Performance monitoring operation administration and maintenance (OAM) cells are transmitted through a plurality of lines from one ATM exchange to another. The transfer of the OAM cells allows the performance of the line from one exchange (point) to another to be monitored.

Conventionally, the performance monitoring facility to which the present invention is directed has been realized by a processor since its inherent function has been one which should be handled by a processor.

However, the amount of processing of messages transferred with the processor of an opposing ATM exchange by using the performance monitoring (PM) OAM cells is considerably large, so the load of the processor has become considerably heavy. For this reason, there is a problem that processing which should be handled by the processor other than the monitoring of the performance can no longer be carried out at high speed.

In addition to this, a high speed communication interface must be provided between the line interface equipment (L•INF) transferring the monitoring use OAM cells via the lines and the processor, that is, in an ATM switch arranged between the equipment (L•INF) and the processor, so there is a problem of an increase of costs of the ATM exchange.

SUMMARY OF THE INVENTION

Accordingly, in consideration of the above problem, an object of the present invention is to provide a performance monitoring facility in an ATM switching system which does not require a high speed communication interface to be provided between the line interface equipment (L•INF) and the processor and thereby can simplify the processing for monitoring the performance to be handled by the processor.

To attain the above object, the present invention is constituted as follows. Namely, inside the line interface equipment, a state managing unit is employed which performs communication of only both information concerning the starting and stopping of the monitoring of the performance and information concerning the monitoring, with said processor, and which, after entering into the state starting the monitoring, manages by itself the state of progress of the monitoring of the performance, which state is changed by successively performing communications of OAM cells with the opposing ATM exchange, and thus autonomously executing the processing without the intervention of the processor. By this, the load exerted on the processor is reduced and therefore the high speed communication interface becomes unnecessary.

BRIEF DESCRIPTION OF THE DRAWINGS

The above object and features of the present invention will become more apparent from the following description of the preferred embodiments given with reference to the accompanying drawings, wherein:

FIG. 27 is a view of an example of an ATM switching system to which the present invention is applied;

FIGS. 28A and 28B are views of the situation of transfer of OAM cells;

FIGS. 29A, 29B, and 29C are views of an example of field mapping of an OAM cell; and FIGS. 30A and 30B are views of a more detailed structure of an ATM exchange shown in FIG. 27.

DESCRIPTION OF THE PREFERRED EMBODIMENTS

Figure 1:
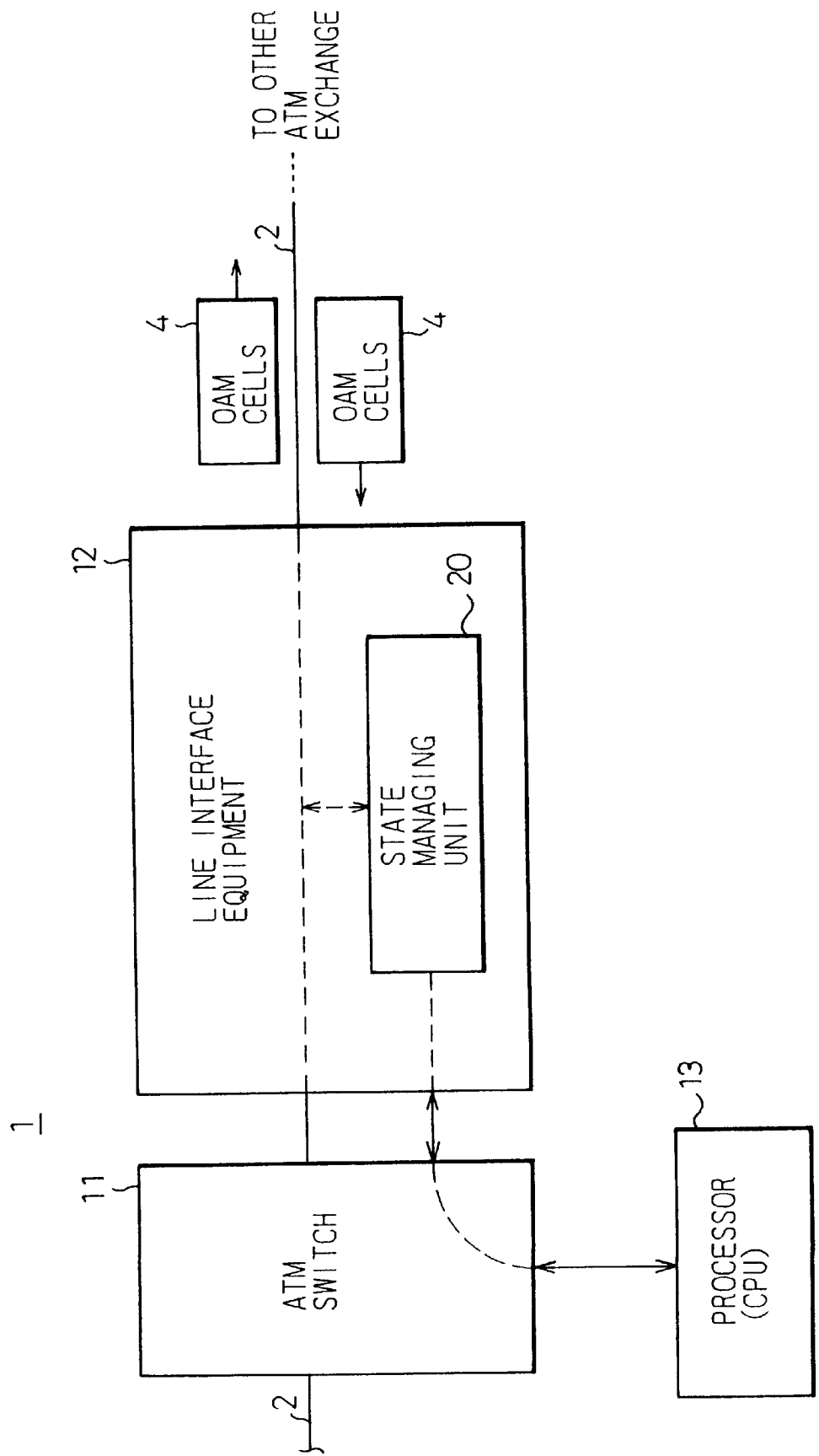
FIG. 1 is a view of the basic configuration of the present invention.

Before describing the embodiments of the present invention, the related art and the disadvantages therein will be described with reference to the related figures.

FIG. 27 is a view of an example of an ATM switching system to which the present invention is applied. This ATM switching system comprises four ATM exchanges 1 (point A, point B, point C, and point D in the figure) and lines 2 connecting them in cascade. In the figure, performance monitoring OAM (Operation Administration and Maintenance) cells (hereinafter referred to as OAM cell or OAM cells) are transmitted through a plurality of lines 2 from the ATM exchange 1A to the exchange 1D. The transfer of the OAM cells enables the transmission quality of the lines from the point A (1A) to the point D (1D) to be monitored.

For the monitoring of the performance, the performance monitoring OAM cells start to be transmitted in response to an activation request from the console of the point A (1A) or the central management center of the overall system i.e., the "opened support system" (OSs).

On the other hand, the point D (1D) starts to receive the performance monitoring OAM cells in response to the activation request from the console of the point D (1D) or the OSs.

The transfer of such performance monitoring OAM cells enables the transmission quality between the point A (1A) and the point D (1D) to be monitored.

Note that, in the monitoring of the performance in FIG. 27, there are two "designations". One is the "forward monitoring" designation for designating that the OAM cells (4) should be transmitted from the point A (1A) to the point D (1D), while the other is the "backward reporting" designation for designating that the result of monitoring of the performance between the point A (1A) and the point D (1D) should be returned to the point A (1A).

Further, concerning the monitoring of performance in FIG. 27, (i) The activation request is placed in an activation (ACT) request OAM cell (4) at the point A (1A) and notified to the point D (1D) so as to start the monitoring.

(ii) On the other hand, a deactivation (suspension) request is placed in a deactivation request OAM cell (4) at the point A (1A) and notified to the point D (1D) so as to suspend the monitoring.

FIGS. 28A and 28B are views of the state of transfer of OAM cells. In FIG. 28A, a state is shown where a series of cells 3 and 4 flow along the lines 2 from the point A (1A) to the point D (1D). Here, the cells 3 are "user information" (UI) cells, while the cells 4 are OAM cells for monitoring the performance as mentioned above. The UI cells 3 are the original data cells used for the communication between subscribers.

Each OAM cell 4 is inserted periodically into the flow of a series of cells so as to sandwiching a predetermined number of UI cells 3. How these OAM cells 4 are used for the monitoring of performance can be freely determined. For example, in a OAM cell 4, the number of the UI cells transmitted following this is written. Then, the number of the UI cells arriving at the opposing point (for example the point D) is checked at this point D. When the number of cells actually received at the point D is smaller or larger than the number of cells transmitted and written in the OAM cell 4, it is decided that the performance of the lines 2 has considerably deteriorated.

Further, as another example, it is also possible to find the degree of damage of the UI cells 3 not by the increase or decrease of the number of the UI cells, but by a parity check etc. using the OAM cells 4.

FIG. 28B is a view of a more detailed example of the cells in FIG. 28A. Particularly it shows the pattern of insertion of the performance monitoring (PM) cells. The PM cells are OAM cells of a type particularly related to the present invention. Note that, as the type of this OAM cell, other than this, there are an alarm cell, fault detection cell, etc.

FIG. 28B shows an example of a case where "128" is specified as the size of the PM block. Further, it shows a case where the user cells are all nonpriority cells.

An example of the performance monitoring method is shown in the following steps (1) to (6).

(1) The receiving side counts the received user cells (*1) (counts the nonpriority cells of the 128 cells in the above example).

(2) The number of cells received at (1) and the TUC-$_{0+1}$ written in the OAM cell received at *2 (number of cells actually sent by transmitting side=128) are compared.

(3) Where there is a difference in the results compared at (2), it means there is a misinsertion (+ difference) or cell loss (− difference).

(4) The receiving side adds the number of the received user cells (*3) to the number of cells of *1 for the counts (counts nonpriority cells of 256 cells in the above example).

(5) The number of cells received at (4) and the TUC-$_{0+1}$ written in the OAM cell received at *4 (number of cells actually sent by transmitting side=256) are compared.

(6) Where there is a difference in the results compared at (5), it means there is a misinsertion (+ difference) or cell loss (− difference).

This is subsequently repeated.

Note that, the "TUC" in the figure means a total user cell, and "CLP" means cell loss priority.

Figure 29B:
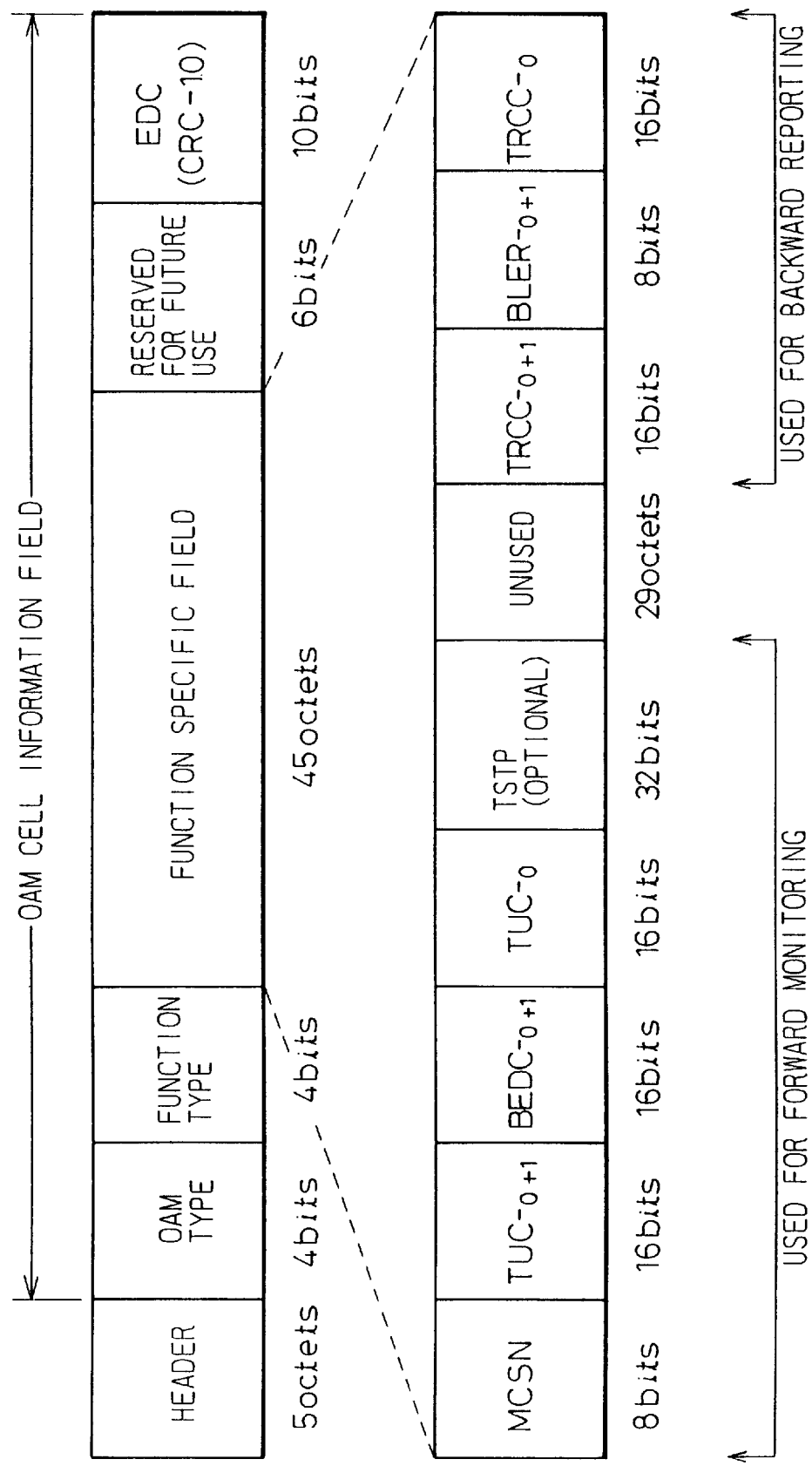
Figure 29C:
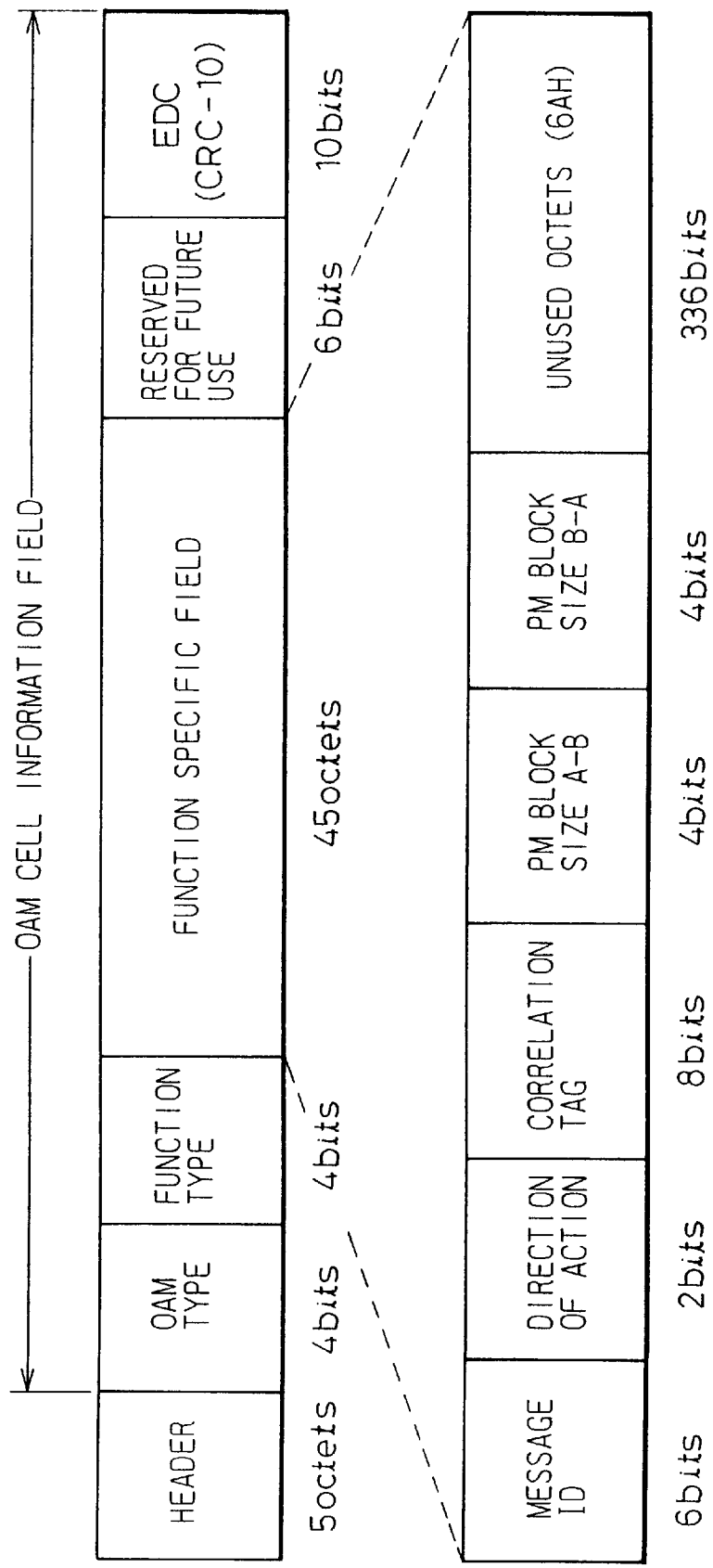

FIGS. 29A, 29B, and 29C are views of an example of field mapping of an OAM cell. In FIG. 29A, the OAM cell 4 is a cell of a fixed length, for example, has a 53-byte length similar to a general ATM cell.

The field of the 53-byte length breaks down, as illustrated, into a header, OAM functions, forward monitoring information, and backward reporting information.

The header indicates that the cell is not a UI cell, but an OAM cell for monitoring performance.

The OAM functions indicate that the cell has an OAM function for monitoring performance. Other than this, as the OAM functions, there are an OAM function for testing, an OAM function for alarm notification (mentioned before), etc., but these two OAM functions are not directly related to the present invention.

The forward monitoring information is for the point A (1A) to transfer to the point D (1D) the monitoring information of how many UI cells 3 follow the OAM cell 4 as mentioned before.

The backward reporting information is information used for returning the monitoring data (monitoring result) collected by the point D (1D) to the point A (1A) (refer to the performance monitoring OAM cell represented by a leftward arrow in FIG. 27) based on the monitoring information transmitted by the OAM cell 4 from the point A (1A) to the point D (1D) as mentioned before.

FIG. 29B is a view of a more detailed example of FIG. 29A and shows the format (ITU I610 version) of the PM type OAM cell.

In FIG. 29B, the content (one example) of each field is as follows:

OAM Type:
  0010 (Performance Monitoring)
Function Type:
  0000 (Forward Monitoring)
  0001 (Backward Monitoring)
MCSN: Sequence number of monitoring Cell
$TUC_{0+1}$: Number of cells of transmitted CLP=0 (priority cells) and CLP=1 (nonpriority cells)
$BEDC_{0+1}$: BIP-16 error detection code of transmitted cells (result of coding the transmitted cells by BIP-16)
$TUC_0$: Number of cells of transmitted CLP=0
$TRCC_{0+1}$: Number of cells of received CLP=0, 1
$BLER_{0+1}$: BIP-16 error detection code of received cells (result of parity check of received cells by BIP16)
$TRCC_0$: Number of cells of received CLP=0

Note that, the main abbreviations in the figure have the following meanings:
  MCSN: Monitoring cell sequence number
  TUC: Total user cell number
  BEDC: Block error detection code
  TSTP: Time stamp
  TRCC: Total received cell count
  BLER: Block error result FIG. 29C shows another more detailed example of FIG. 29A and shows the format of the activation/deactivation cell of the PM type (ITU I610 version).

In FIG. 29C, the content (one example) of each field is as follows:

OAM Type:
  1000 (Activation/Deactivation)
Function Type:
  0000 (Performance Monitoring)
Message ID:
  000001 (Activate)
  000010 (Activation Confirmed)
  000011 (Activation Request Denied)
  000101 (Deactivate)
  000110 (Deactivation Confirmed)
  000111 (Deactivation Request Denied)
Direction of Action:
  01 (designation of monitor for B-A direction)
  10 (designation of monitor for A-B direction)
  11 (designation of monitor for both directions)
Correlation Tag:
  Identifier for bringing transmitted command into correspondence with the response thereof
PM block Size A-B: Designation of insertion period of OAM cells for A-B direction
  ON at 0th bit (128 block size)
  ON at first bit (256 block size)
  ON at second bit (512 block size)
  ON at third bit (1024 block size)
PM block Size B-A: Designation of insertion period of OAM cells for B-A direction
  ON at 0th bit (128 block size)
  ON at first bit (256 block size)
  ON at second bit (512 block size)
  ON at third bit (1024 block size)

Figure 30B:
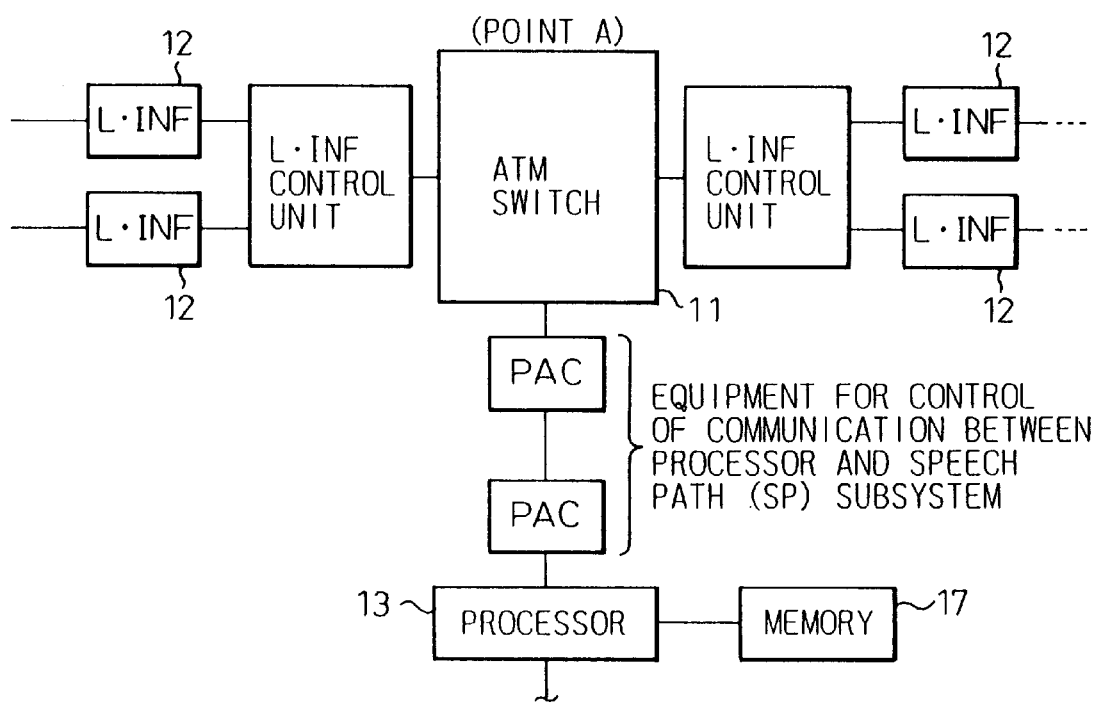

FIGS. 30A and 30B are views showing a more detailed configuration of each ATM exchange shown in FIG. 27. In FIG. 30A, 1 is the above ATM exchange, for example, an ATM exchange (point A) 1A. This ATM exchange 1 is connected to another ATM exchange (for example the above point D (1D)) via the lines 2. These point A and point D have the same configurations.

Namely, the configurations comprise the illustrated components 12, 13, 14, 15, 16, and 17.

The components 12 are line interface equipment (L•INF) (hereinafter also referred to as interface equipment) which are inserted in series in the line 2. In the figure, they are shown divided into two rows and paired off. The line interface equipment (L•INF) 12 of the upper row are the active equipment, and the line interface equipment (L•INF) of the lower row are standby equipment, thereby given a so-called duplex configuration.

Each line interface equipment (L•INF) 12 is equipment for controlling the transfer of cells communicated with the opposing ATM exchange 1 via the lines 2. Note that, this interface equipment (L•INF) is used also for interfacing between the subscriber line circuits and the ATM switch 11 and interfacing between the intra-office lines and the ATM switch 11.

The component 13 is a processor for controlling the ATM switch 11 and controlling each line interface equipment (L•INF) and acts as the center of the overall ATM exchange 1 together with the memory 17 cooperating with this processor 13.

The component 15 is a console described before. The above activation request and deactivation request can be sent from here.

The component 14 is a console control apparatus for controlling the console 15 and cooperates with the processor 13.

The component 17 is the above memory which stores the programs and temporarily holds the data.

Further, reference numeral 18 in the figure shows the central management center (OSs) described before. The activation request and deactivation request are sometimes sent from here. This OSs 18 centrally manages the entire ATM switching system shown in FIG. 27.

FIG. 30B is a view further concretely showing one part in FIG. 30A. Particularly, the processor access controllers (PAC) in FIG. 30B are units which should be noted.

The mechanism of PAC communication may be summarized as follows:

Processors or a processor and speech path (SP) subsystem are connected via PACs. The PACs control the communication between processors or between a processor and SP subsystem. The actual transfer of data is performed by a direct memory access (DMA) transfer.

Referring again to FIG. 27, conventionally, the performance monitoring facility to which the present invention is directed has been realized by a processor 13 since its function should have inherently been handled by a processor 13.

However, the amount of processing of messages communicated with the processor of an opposing ATM exchange by the performance monitoring (PM) OAM cells 4 is considerably large, so the load of the processor 13 has become considerably heavy. For this reason, there is the above problem that processing which should be handled by the processor 13 other than the monitoring of the performance can no longer be carried out at high speed.

In addition to this, a high speed communication interface must be provided between the line interface equipment (L•INF) 12 transferring the monitoring use OAM cells 4 via the lines 2 and the processor 13, that is, in an ATM switch 11 arranged between the equipment (L•INF) 12 and the processor 13, so there is the above problem of an increase of costs of the ATM exchange.

The present invention provides a performance monitoring facility in an ATM exchange system which does not require a high speed communication interface to be provided between the line interface equipment (L•INF) 12 and the processor 13 and which can simplify the processing for monitoring the performance to be handled by the processor 13. This will be explained in detail below.

FIG. 1 is a view of the basic configuration of the present invention. In the figure, the principal parts of the components of FIG. 30A are extracted.

In FIG. 1, the ATM exchange 1 comprises an ATM switch 11 inserted into the lines 2 for the transfer of the cells 3 and 4 and line interface equipment 12 which is attached to the ATM switch 11 and transfers the cells 3 and 4 under the management of the processor 13. The ATM exchange 1 transfers the OAM cells 4 for monitoring the performance of the lines 2 connected to an opposing ATM exchange.

The characteristic feature of the present invention in such an ATM exchange 1 resides in the line interface equipment 12, particularly the state managing unit 20 formed inside this. The state managing unit 20 performs communication with the processor 13 only of information concerning the starting and stopping of the monitoring of the performance and information concerning the monitoring and, after entering into a state starting the monitoring, manages by itself the state of progress of the monitoring of the performance, which state is changed by successively performing communications of OAM cells 4 with the opposing ATM exchange, and thus autonomously executing the monitoring without the intervention of the processor 13.

Thus, most of the processing for monitoring the performance using the performance monitoring OAM cells 4 will be autonomously carried out under the self management of the line interface equipment 12 without intervention of the processor 13. As a result, the load on the processor 13 is greatly reduced. Further, the amount of information communicated between the processor 13 and the line interface equipment 12 is reduced, a high speed communication interface which has been conventionally considered to be necessary between them becomes unnecessary, and only a low speed communication interface becomes sufficient.

Figure 2:
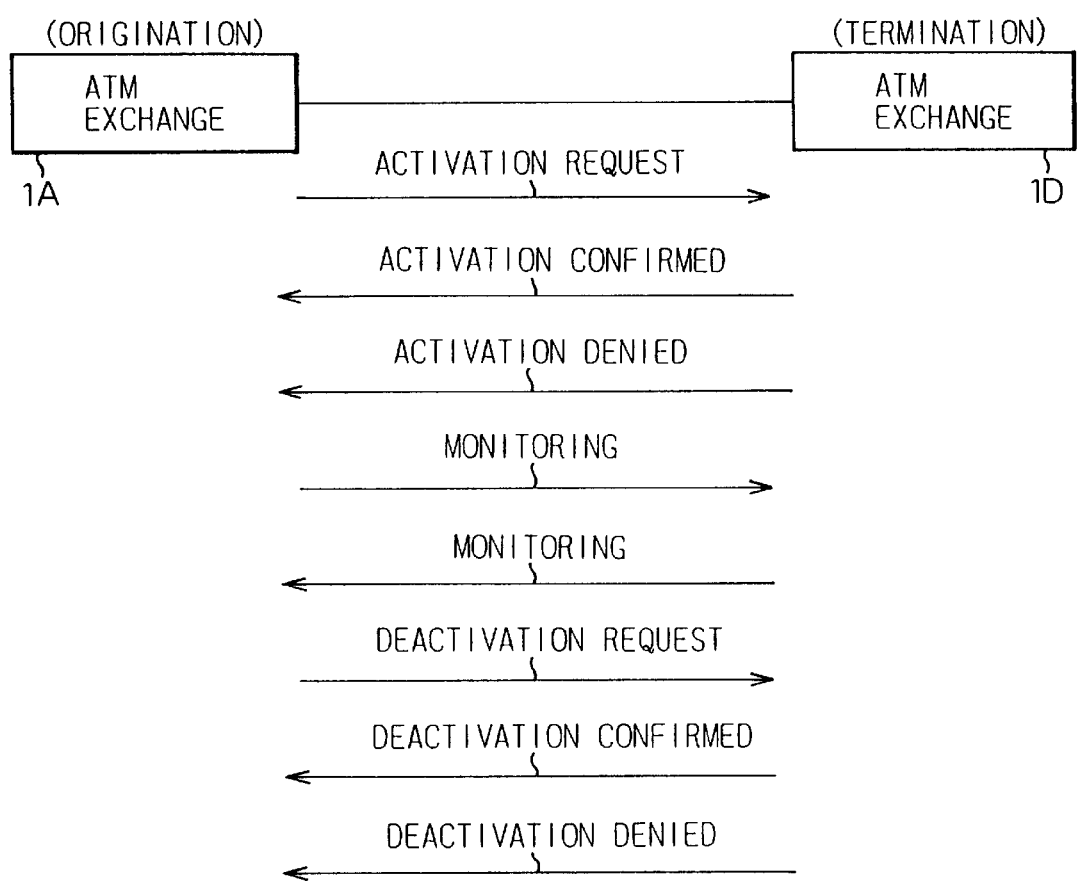
FIG. 2 is a view of various commands communicated with an opposing ATM exchange.

FIG. 2 is a view of various commands transferred between opposing ATM exchanges. In the figure, the opposing ATM exchanges on an originating side and terminating side are for example the points 1A and 1D in FIG. 2. Various prescribed commands (for example the specification of BellCore) transferred between them are shown and are transferred using the OAM cells 4. The meanings of the various commands are as follows. An explanation will be sequentially made from the upper stage to the lower stage of the figure.

"Activation Request": Command by which the point A (1A) requests the point D (1D) the start of monitoring of the performance.

"Activation Confirmed": Response by which the point D (1D) sends confirmation to the point A (1A) that it can respond to the "Activation Request".

"Activation Denied": Command by which the point D (1D) indicates to the point A (1A) that it cannot respond to the "Activation Request" and rejects it.

"Monitoring (right direction)": Indication that the OAM cells are the flow of cells for monitoring the performance in the direction from the point A to the point D.

"Monitoring (left direction)": Indication that the OAM cells are the flow of cells for monitoring the performance in the direction from the point D to the point A.

"Deactivation Request": Command by which the point A requests to the point D the suspension of the monitoring of performance.

"Deactivation Confirmed": Response by which the point D (1D) sends confirmation to the point A (1A) that it can respond to the "Deactivation Request".

"Deactivation Denied": Response by which the point D indicates to the point A that it cannot respond to the "Deactivation Request" and rejects it.

FIGS. 3 to 10 are first to eighth parts of a view of the change in the state of progress for monitoring of the performance self-managed by a state managing unit 20.

These FIG. 3 to FIG. 10 specifically show the following: Namely, the state managing unit 20 inside the line interface equipment 12, after entering a state starting the monitoring, successively performs communication of OAM cells 4 with the opposing ATM exchange so as to manage the changing state of progress for the monitoring of the performance and autonomously executes the monitoring without the intervention of the processor 13 and, further, performs the communication with the processor 13 only of the information concerning the starting and stopping of the monitoring of performance and the information concerning that monitoring.

Note that, throughout all of the figures, parts shown in double-line blocks show states originally defined in the above standard (the specification of Bellcore).

Figure 3:
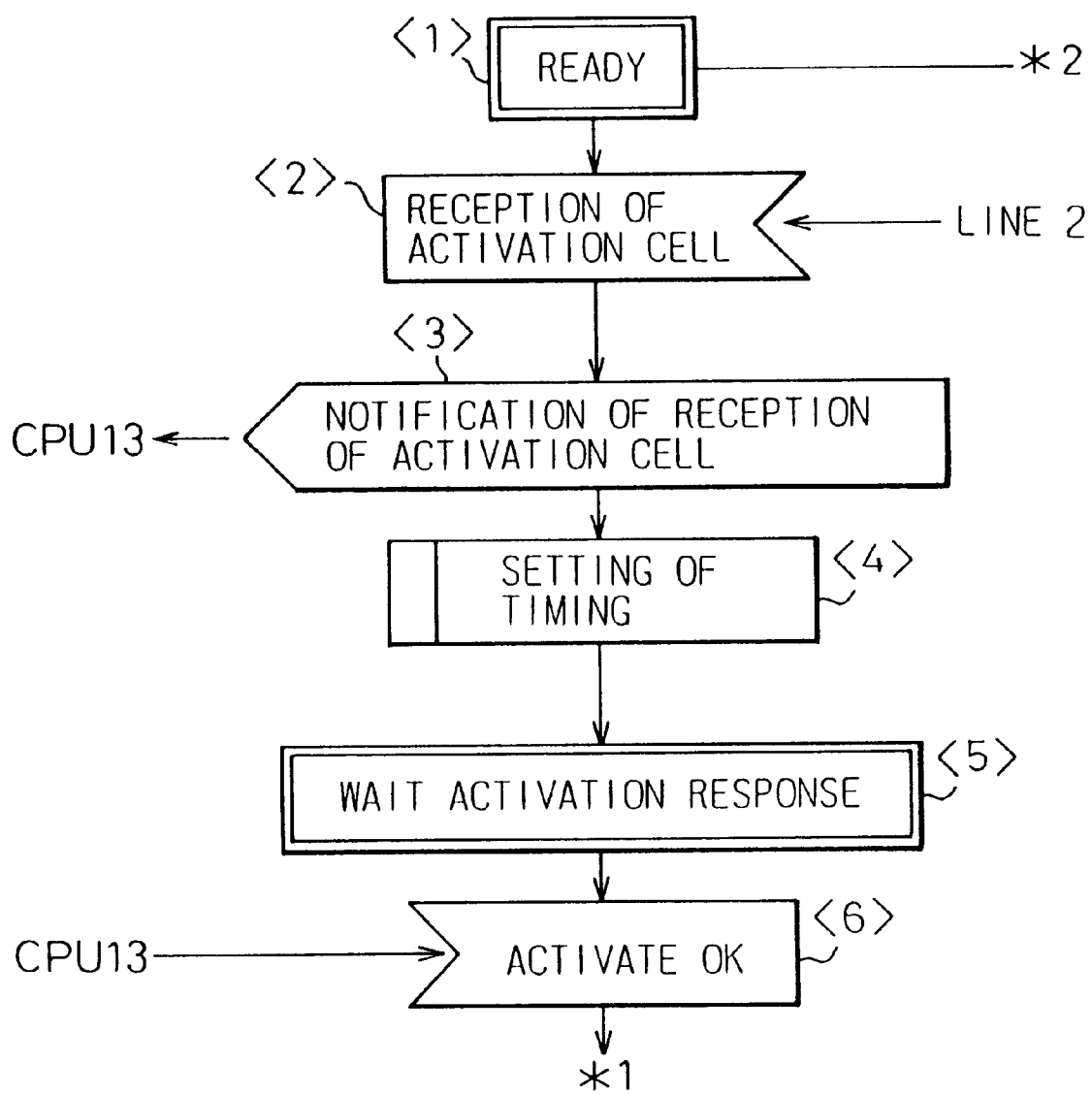
FIG. 3 is part one of a view of the change in the state of progress of monitoring of the performance self-managed by a state managing unit 20.

First, FIG. 3 (part one) will be referred to.

<State 1> A standby state standing by for the arrival of an event generated next (READY).

<State 2> Thereafter, according to the above example, assume that an OAM cell 4 containing an "Activation Request" is received via the lines 2 from the point D (1D) (RECEPTION OF ACT CELL).

<State 3> The fact of state 2 is notified to the processor (CPU) 13 of the point A (1A) (NOTIFICATION OF RECEPTION OF ACT CELL).

<State 4> The timer processing is started at the same time as this (SETTING OF TIMING).

<State 5> A response from the CPU 13 responding to the notification of <State 3> is awaited for a predetermined time set in <State 4> (WAIT ACTIVATION RESPONSE).

<State 6> Assume that the response from the CPU 13 with respect to that notification is OK (ACTIVATE OK).

Figure 4:
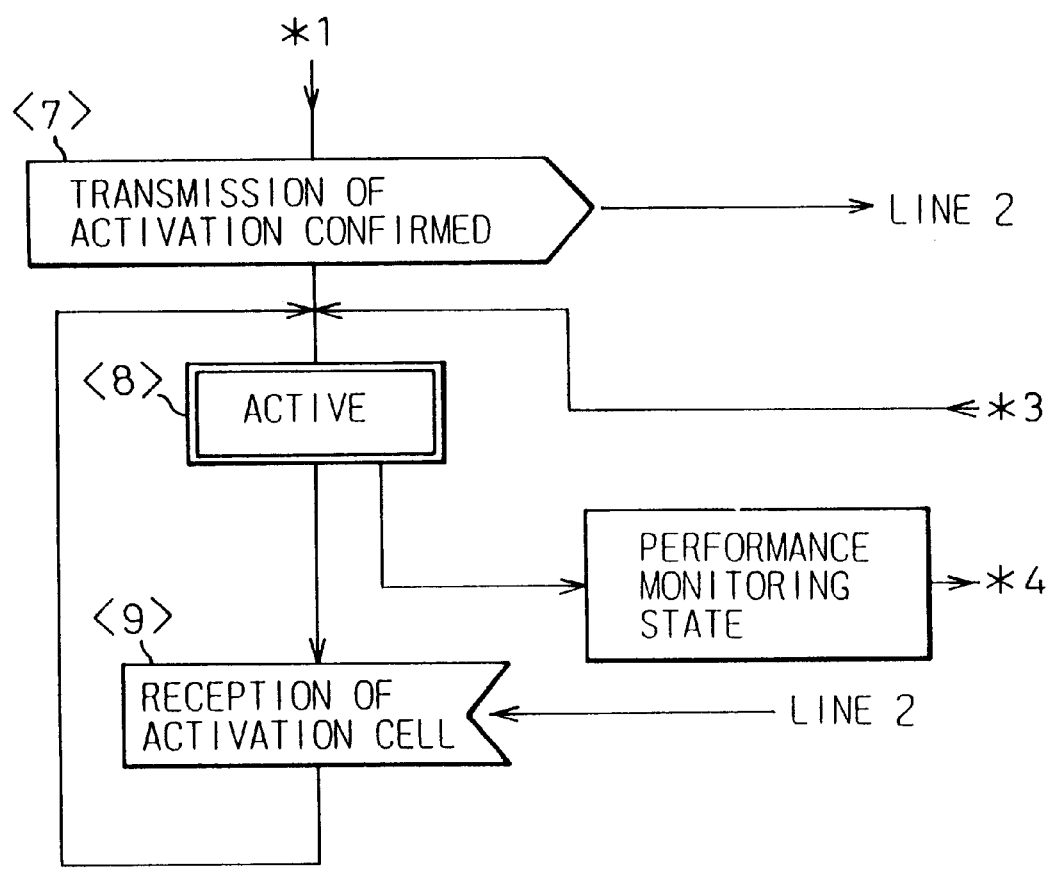
FIG. 4 is part two of a view of the change in the state of progress of monitoring of the performance self-managed by a state managing unit 20.

Next, FIG. 4 (part two) will be referred to.

<State 7> The above "Activation Confirmed" is returned to the point D (1D) via the lines 2 (TRANSMISSION OF ACTIVATION CONFIRMED).

<State 8> Here, the point A enters into the original activation state (active). Namely, it enters into the illustrated performance monitoring state. Further, the CPU of the point A collects the monitoring data.

<State 9> Assume that an OAM cell 4 containing an "Activation Request" is further received from the lines 2 after it enters into the state of activation in the <State 8> (RECEPTION OF ACTIVATION CELL). In this case, the routine returns to <State 8> without notifying the reception to the CPU 13.

Here, before entering into the explanation of FIG. 5 and subsequent figures, a simple explanation will be made of 12 detailed examples regarding the monitoring of performance executed in <State 8> of FIG. 4 (PERFORMANCE MONITORING STATE in FIG. 4).

(1) Severely Errored Cell Blocks (SECBs)

The number of occurrences of cell loss, misinsertion of cells, and parity errors exceeding the prescribed number determined at the monitoring point is counted in a block of user cells (a group of OAM cells and user cells in a portion surrounded by the OAM cells. 128/256/512/1024 user cells exist). For example, at a point which sets the prescribed number of cells lost as three cells, when there are four cells lost, the count is increased by one.

Explaining this item briefly, it can be said that the number of occurrences of serious errors exceeding the prescribed number determined at that point is monitored.

(2) Errored Cells

Where less than a prescribed number of parity errors determined by the monitoring point occur in a block of a user cell, the number of occurrences of the errors is counted.

For example, at a point which sets the prescribed number of parity errors as three, where there are two parity errors, the count is increased by two.

Explaining this in brief, it can be said that a number of occurrences of light parity errors of less than a prescribed number determined at that point is monitored.

(3) Lost User 0+1 Information Cells

Where priority/nonpriority cells less than a prescribed number determined at the monitoring point are lost in a block of a user cell, the number of the lost cells is counted.

For example, at a point which sets the prescribed number of the lost cells as three, when there are two lost cells, the count is increased by two.

Explaining this in brief, it can be said that a number of occurrence of light cell loss less than a prescribed number determined at that point is monitored.

(4) Lost User 0 Information Cells

Where priority cells less than a prescribed number determined at the monitoring point are lost in a block of a user cell, the number of the lost cells is counted.

For example, at a point which sets the prescribed number of the lost cells as three, when there are two lost cells, the count is increased by two.

Explaining this in brief, it can be said that a number of occurrence of light cell loss of the priority cell less than a prescribed number determined at that point is monitored.

(5) Misinserted User Information Cells

Where priority/nonpriority cells less than a prescribed number determined at the monitoring point are misinserted in a block of a user cell, the number of the misinserted cells is counted.

For example, at a point which sets the prescribed number of the misinserted cells as two, when there is one misinserted cell, the count is increased by one.

Explaining this in brief, it can be said that a number of occurrence of light cell misinsertion less than a prescribed number determined at that point is monitored.

(6) Number of Transmitted 0+1 User Information Cells

The number of received priority/nonpriority cells is counted.

(7) Number of Transmitted 0 User Information Cells

The number of the received priority cells is counted.

(8) Impaired Blocks

The number of occurrences of error of any of the parity error, cell loss, and cell misinsertion in a block of a user cell is counted.

Explaining this in brief, it can be said that the number of times of detection of any abnormality in a block of the user cell is monitored.

(9) Total Lost 0+1 User Information Cells

The number of priority/nonpriority cells lost during a monitoring period is counted.

(10) Total Lost 0 User Information Cells

The number of priority cells lost during a monitoring period is counted.

(11) SECB Errored

The number of occurrences of parity errors exceeding the prescribed number determined at the monitoring point is counted in a block of a user cell.

Explaining this in brief, it can be said that a number of occurrences of serious parity errors more than the prescribed number determined at that point is monitored.

(12) SECB Misinserted

The number of occurrences of misinserted cells exceeding the prescribed number determined at the monitoring point is counted in a block of a user cell.

Explaining this in brief, it can be said that a number of occurrences of serious misinserted cells more than the prescribed number determined at that point is monitored.

Figure 5:
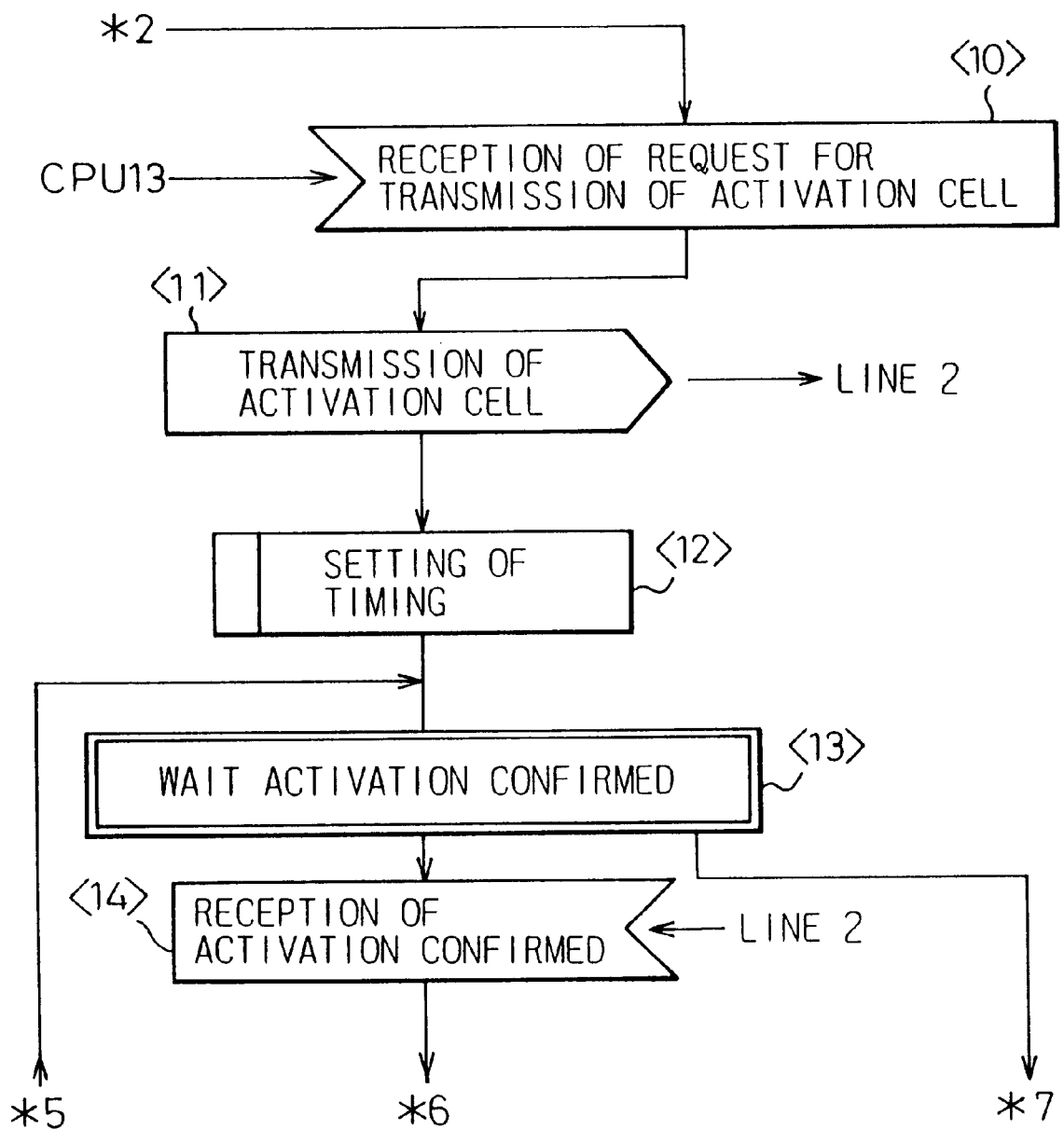
FIG. 5 is part three of a view of the change in the state of progress of monitoring of the performance self-managed by a state managing unit 20.

Next, FIG. 5 (part three) will be referred to.

<State 10> Assume that a transmission request of an OAM cell 4 containing the "Activation Request" is received from the CPU 13 of the point A (1A) (RECEPTION OF REQUEST FOR TRANSMISSION OF ACTIVATION CELL).

<State 11> In response to the request at the <State 10>, the OAM cell 4 containing the "Activation Request" is transmitted from the point A to the point D via the lines 2 (TRANSMISSION OF ACTIVATION CELL).

<State 12> The timer processing is started at the same time as this (SETTING OF TIMING).

<State 13> An "Activation Confirmed" from the point D is awaited for a predetermined time set in <State 12> (WAIT ACTIVATION CONFIRMED).

<State 14> Assume that the "Activation Confirmed" from the point D is received from the point D via the lines 2 (RECEPTION OF ACTIVATION CONFIRMED).

Figure 6:
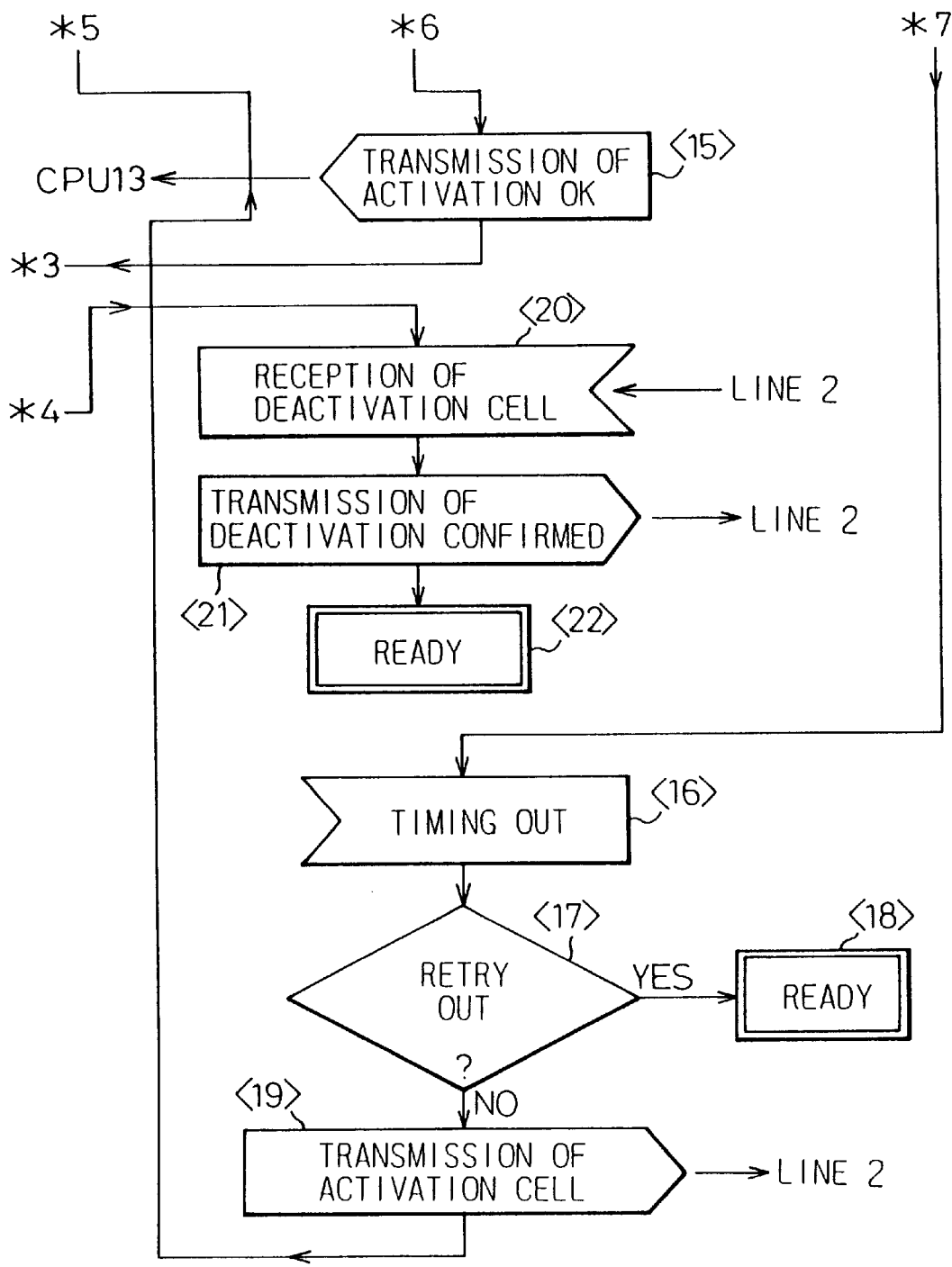
FIG. 6 is part four of a view of the change in the state of progress of monitoring of the performance self-managed by a state managing unit 20.

Next, FIG. 6 (part four) will be referred to.

<State 15> Since the "Activation Confirmed" is received at the <State 14>, the fact that the activation is OK is transmitted to the CPU 13 of the point A (TRANSMISSION OF ACTIVATION OK). The CPU 13 collects the monitoring data of the performance.

<State 16> Assume that the "Activation Confirmed" did not arrive at the point A within the timer time at the <State 13> (TIMING OUT).

<State 17> The transmission of the OAM cell 4 containing the "Activation Request" at <State 11> is attempted again (RETRY OUT?).

<State 18> When the retry at the <State 17> ends in failure (RETRY OUT=YES), the processing returns to the READY state.

<State 19> When the retry at the <State 17> succeeds (RETRY OUT=NO), the point A transmits the OAM cell 4 containing the "Activation Request" to the point D via the lines 2 (TRANSMISSION OF ACTIVATION CELL). Note that this retry is carried out for example three times. Thereafter, the processing returns to the <State 13>.

<State 20> Assume that an OAM cell 4 containing a "Deactivation Request" is received from the point D via the lines 2 after the monitoring is executed by the activation at the <State 8> (start of monitoring of performance) (RECEPTION OF DEACTIVATION CELL).

<State 21> The point A transmits the "Deactivation Confirmed" to the point D via the lines 2 (TRANSMISSION OF DEACTIVATION CONFIRMED).

<State 22> Thereafter, the point A enters into the READY state.

Figure 7:
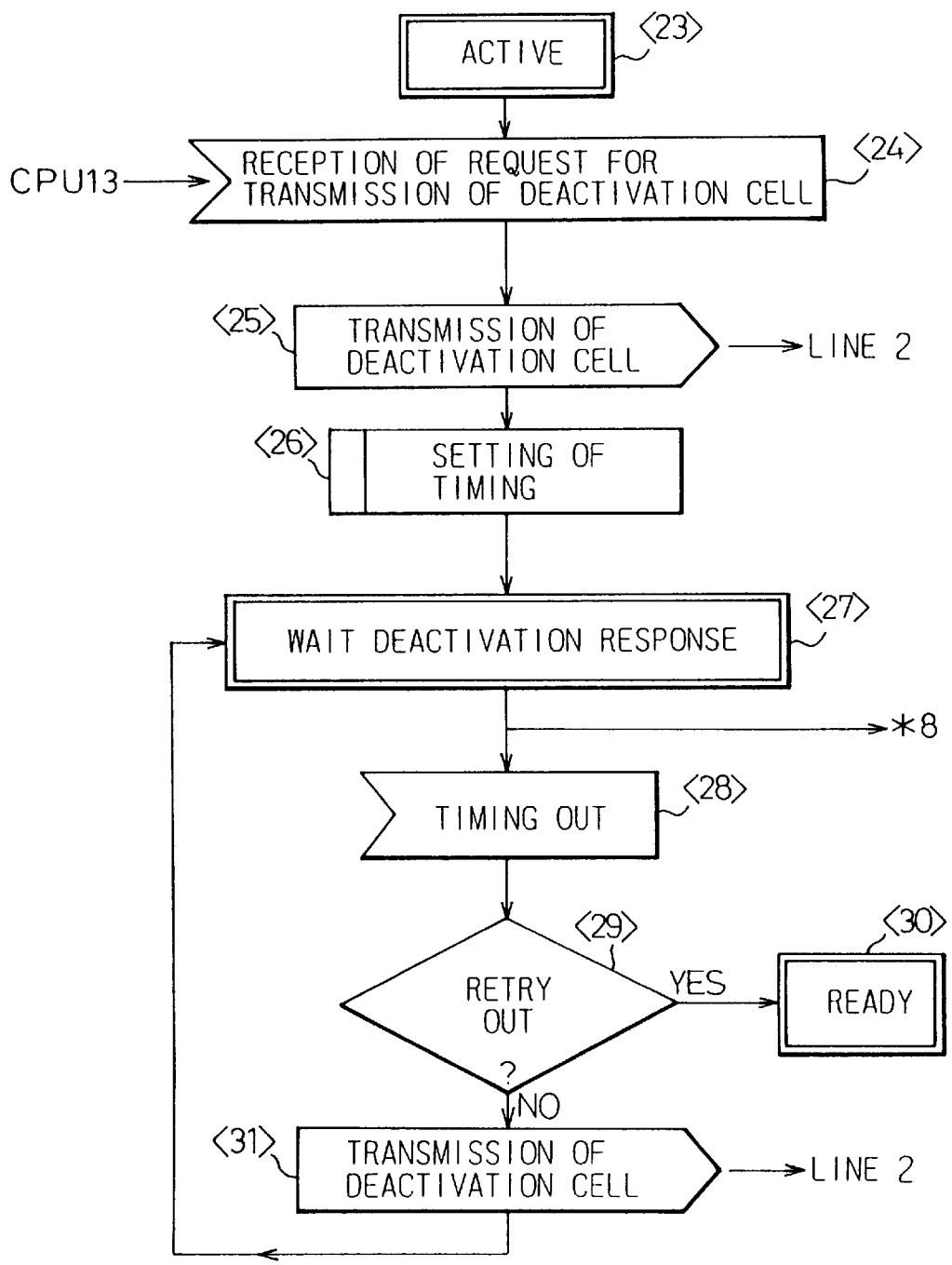
FIG. 7 is part five of a view of the change in the state of progress of monitoring of the performance self-managed by a state managing unit 20.

Next, FIG. 7 (part five) will be referred to.

<State 23> This state corresponds to the <State 8> of FIG. 4. It is the activation state (ACTIVE). Under this state, the intended monitoring of performance is carried out.

<State 24> After the monitoring, assume that, by the request from the CPU 13 in the point A, a request is received, which request indicates that the point D should transmit an OAM cell 4 containing a "Deactivation Request" (RECEPTION OF REQUEST FOR TRANSMISSION OF DEACTIVATION CELL).

<State 25> According to the request at the <State 24>, an OAM cell 4 containing a "Deactivation Request" is transmitted from the point A to the point D via the lines 2 (TRANSMISSION OF DEACTIVATION CELL).

<State 26> The timer processing is started at the same time as this (SETTING OF TIMING).

<State 27> For a fixed time set at the <State 26>, a response to the "Deactivation Request" from the point D is awaited (WAIT DEACTIVATION RESPONSE).

<State 28> Assume that the response with respect to the "Deactivation Request" have not arrived at the point A within the timer time at the <State 27> (TIMING OUT).

<State 29> The transmission of an OAM cell 4 containing a "Deactivation Request" of the <State 25> is reattempted (RETRY OUT?).

<State 30> When the retry at the <State 29> ends in failure (RETRY OUT=YES), the processing returns to the READY state.

<State 31> When the retry at the <State 29> succeeds (RETRY OUT=NO), the point A transmits an OAM cell 4 containing a "Deactivation Request" to the point D via the lines 2 (TRANSMISSION OF DEACTIVATION CELL). Thereafter, the processing returns to the <State 27>.

Figure 8:
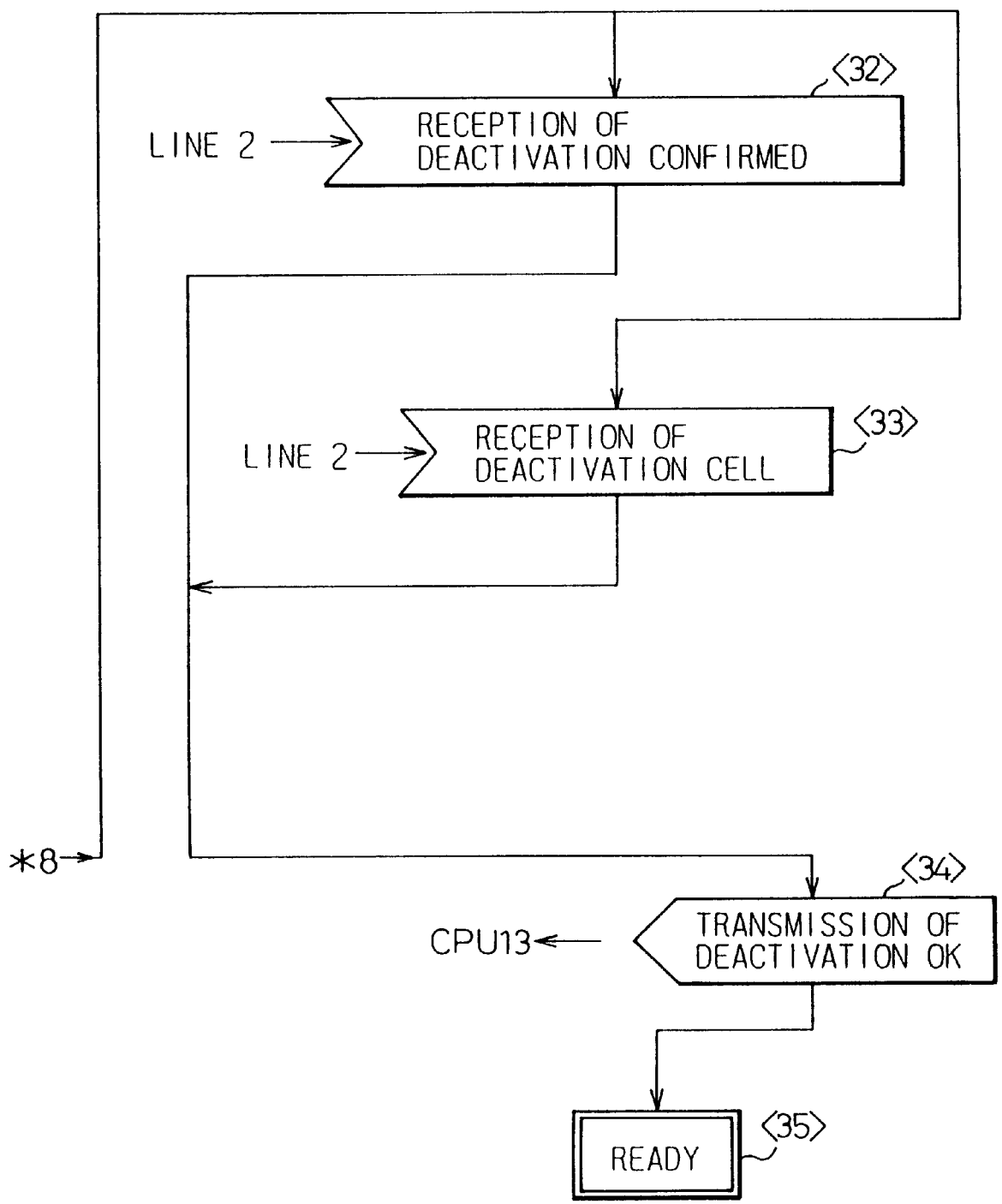
FIG. 8 is part six of a view of the change in the state of progress of monitoring of the performance self-managed by a state managing unit 20.

Next, FIG. 8 (part six) will be referred to.

<State 32> After the waiting state at the <State 27> of FIG. 7, assume that the "Deactivation Confirmed" has been received from the point D via the lines 2 (RECEPTION OF DEACTIVATION CONFIRMED).

<State 33> Alternatively, assume that a "Deactivation Request" has been received from the point D via the lines 2 (RECEPTION OF DEACTIVATION CELL).

<State 34> In both the case of <State 32> and the case of <State 33>, the "Deactivation OK" is notified to the CPU 13 of the point A. Here, the series of monitoring of the performance started after the activation is suspended (TRANSMISSION OF DEACTIVATION OK).

<State 35> Thereafter, the point A returns to the READY state.

Figure 9:
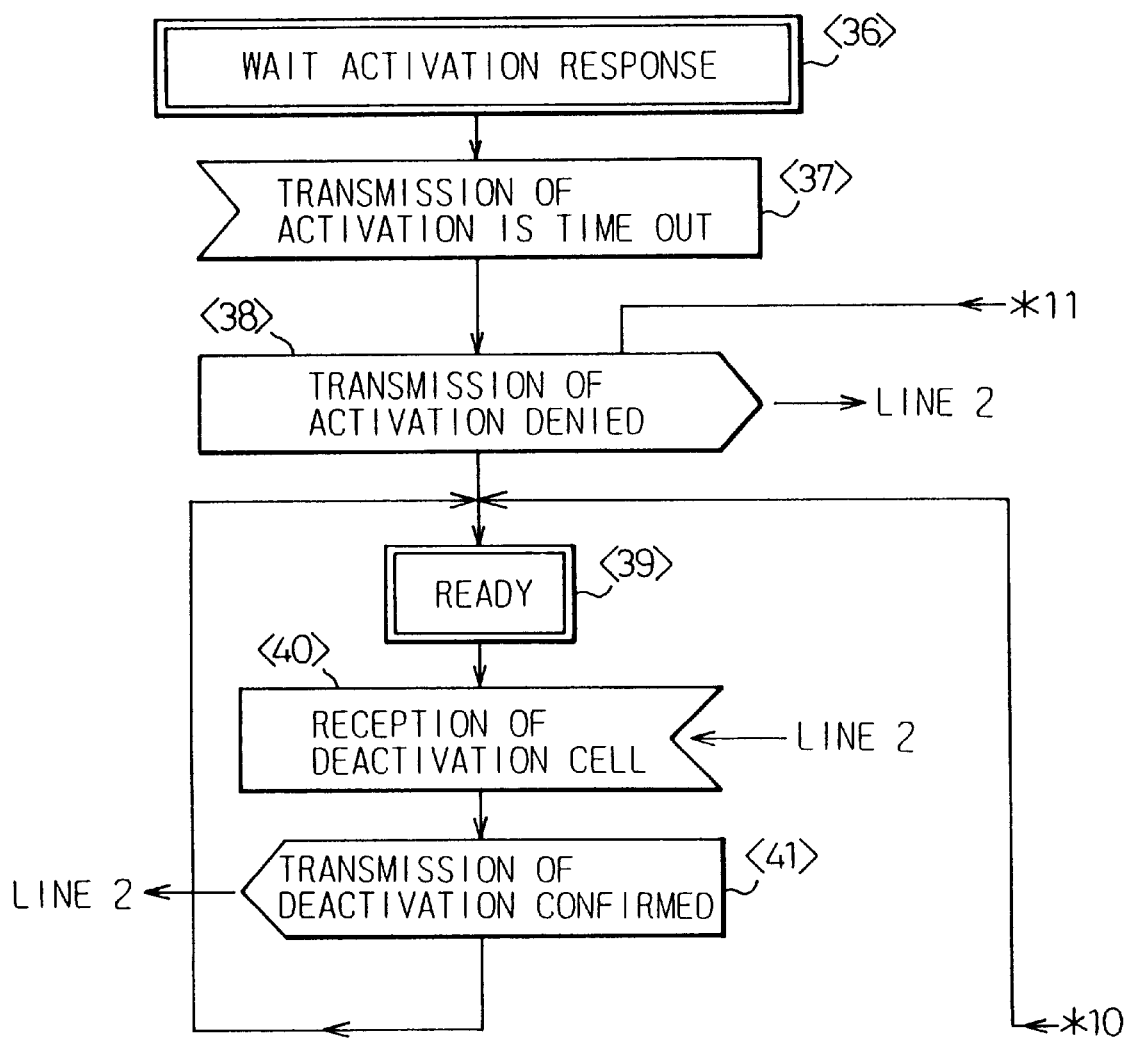
FIG. 9 is part seven of a view of the change in the state of progress of monitoring of the performance self-managed by a state managing unit 20.

Next, FIG. 9 (part seven) will be referred to.

<State 36> This state corresponds to the <State 5> of FIG. 3.

<State 37> Here, assume that the time runs out for the transmission of a response from the CPU 13 regarding activation (TRANSMISSION OF ACTIVATION IS TIME OUT).

<State 38> By the running out of time described above, an "Activation Denied" is transmitted to the point D via the lines 2 by the OAM cell 4 (TRANSMISSION OF ACTIVATION DENIED).

<State 39> Thereafter, the point A returns to the READY state.

<State 40> In the above READY state, assume that an OAM cell 4 containing a "Deactivation Request" has been received from the point D via the lines 2 (RECEPTION OF DEACTIVATION CELL).

<State 41> The point A returns an OAM cell 4 containing a "Deactivation Confirmed" in response to that "Deactivation Request" to the point D via the lines 2 (TRANSMISSION OF DEACTIVATION CONFIRMED). Thereafter, the point A returns to the READY state <39>.

Figure 10:
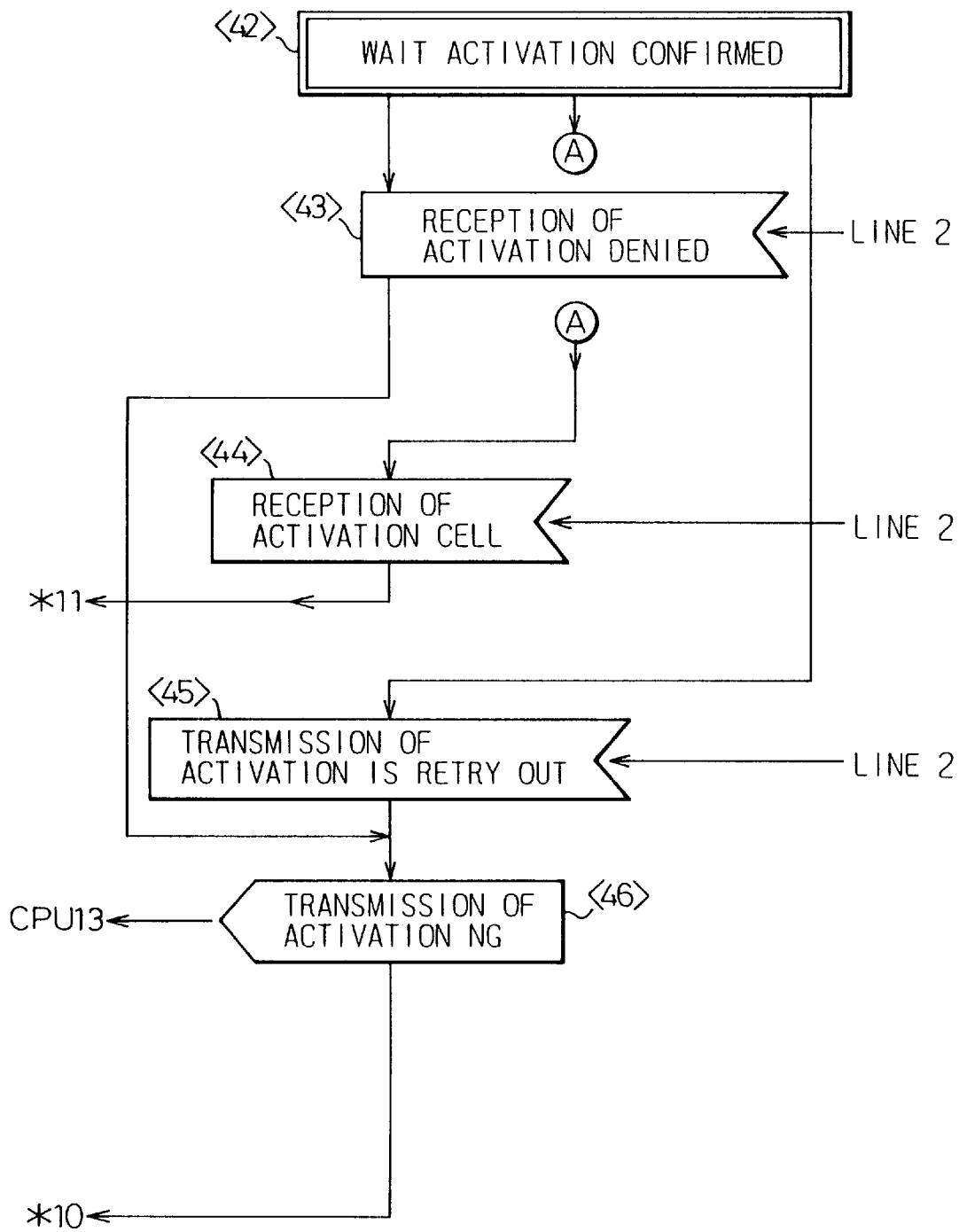
FIG. 10 is part eight of a view of the change in the state of progress of monitoring of the performance self-managed by a state managing unit 20.

Next, FIG. 10 (part eight) will be referred to.

<State 42> This state corresponds to the <State 13> of FIG. 3.

<State 43> Assume that an OAM cell 4 containing an "Activation Denied" has been received from the point D via the lines 2 (RECEPTION OF ACTIVATION DENIED).

<State 44> In the waiting state of <State 42>, assume that an OAM cell 4 containing an "Activation Request" has been received from the point D via the lines 2. In this case, the routine proceeds to the <State 38> of FIG. 9 where the "Activation Denied" is transmitted.

<State 45> Since the transmission of an OAM cell 4 containing the "Activation Request" has failed, a retry for the transmission has attempted for example three times from the waiting <State 42>, but in the end the retry has run out. The notification of the above from the point D has been received via the lines 2 (TRANSMISSION OF ACTIVATION IS RETRY OUT).

<State 46> A message indicating that the activation state was not established after <State 43> or <State 45> is sent to the CPU 13 in the point A. Here, the point A returns to the READY state.

Figure 11A:
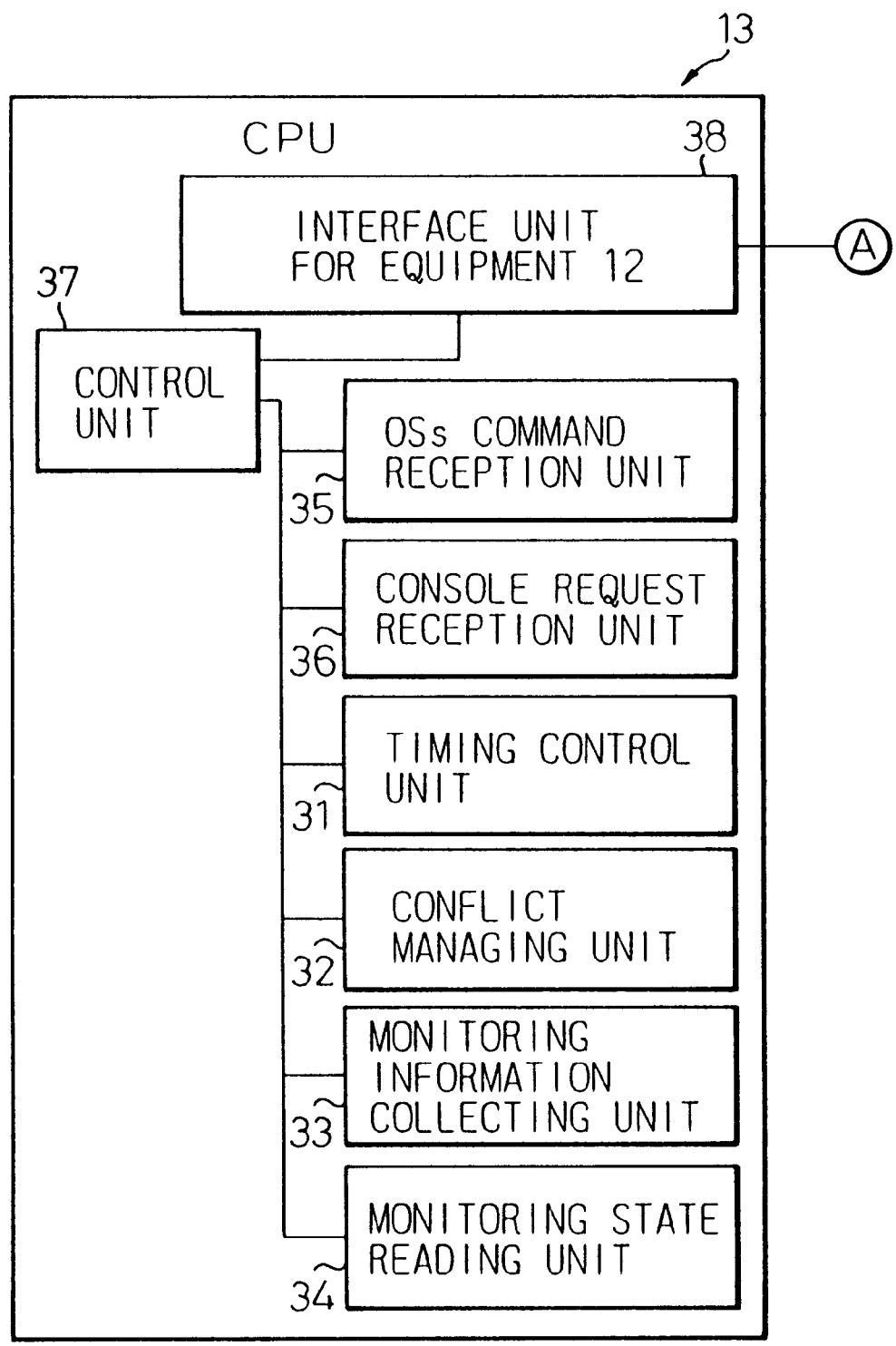
FIGS. 11A and 11B are views showing more detailed examples of the configuration of a line interface equipment 12 and a central processing unit (CPU) 13.
Figure 11B:
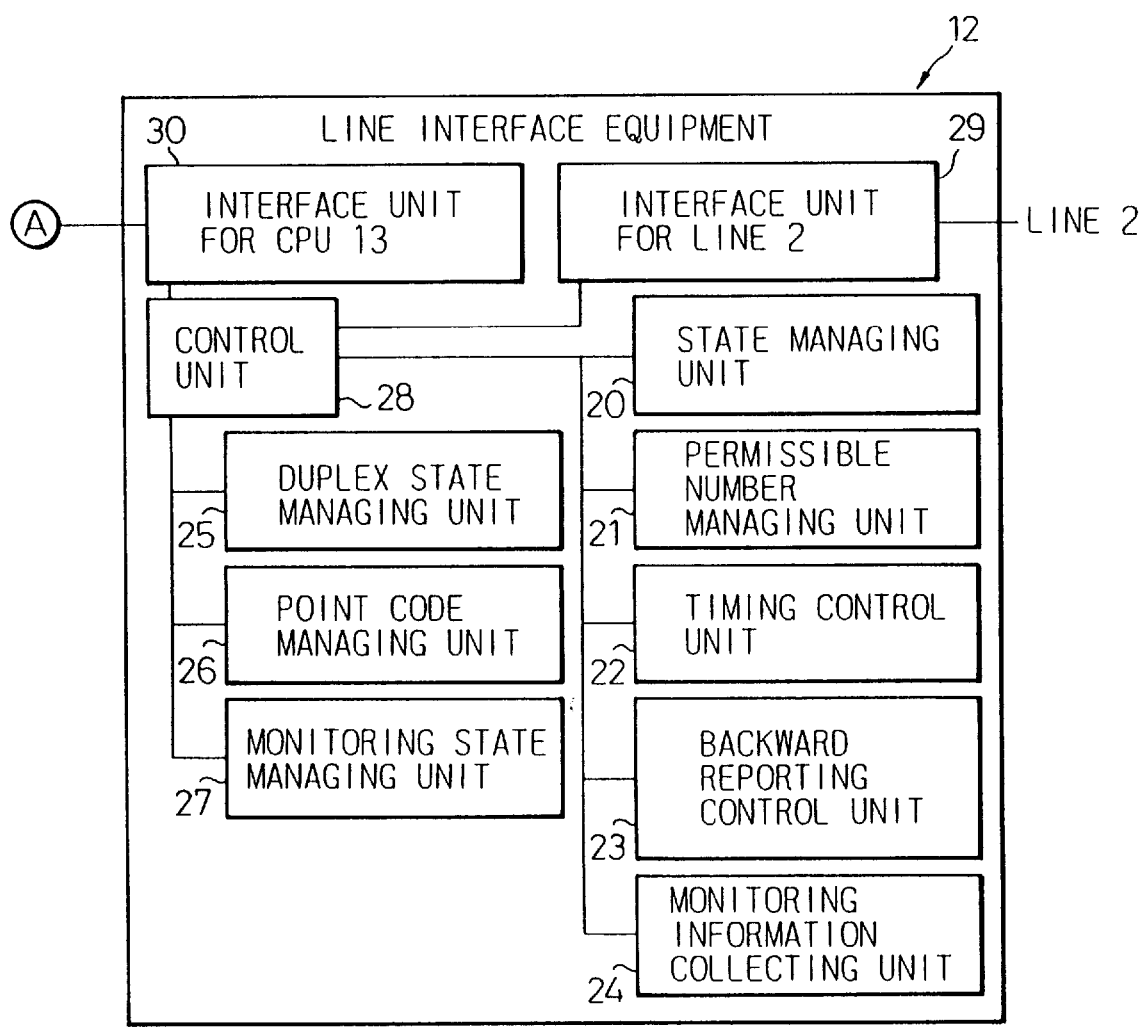

FIGS. 11A and 11B are views showing more concrete examples of the configurations of the line interface equipment 12 and the CPU 13. In the figure, 21 is a permissible number managing unit; 22 is a timing control unit; 23 is a backward reporting control unit; 24 is a monitoring information collecting unit; 25 is a duplex state managing unit; 26 is a point code managing unit; 27 is a monitoring state managing unit; 28 is a control unit; 29 is an interface unit for the line 2; 30 is an interface unit for the CPU 13; 31 is a timing control unit; 32 is a conflict managing unit; 33 is a monitoring information collecting unit; 34 is a monitoring state reading unit; 35 is an OSs command reception unit; 36 is a console request reception unit; 37 is a control unit; and 38 is an interface unit for the equipment 12.

In FIGS. 11A and 11B, the principal part of the present invention is the state managing unit 20 in the line interface equipment 12, as shown in FIG. 1. Further, the situation of the state management (autonomous control for the change of state) is as explained in detail referring to FIG. 3 to FIG. 10. Note that the components 21 to 38 other than this state managing unit 20 will be successively explained in the later explanation of operation. Note that, all components are preferably realized by software.

EXAMPLE 1

This example mainly relates to the functions of the permissible number managing unit 21 in FIG. 11B. The managing unit 21 enables the autonomous control by the state managing unit 20 mentioned before to be made more efficient. Namely, even if the permissible number managing unit 21 receives a large number of "Activation Request" at a time from an opposing ATM exchange 1 (for example point D), all of the requests cannot be accepted. For example, the number of the performance monitoring OAM cells 4 which can be simultaneously processed by one ATM exchange 1 is 128 at maximum. Accordingly, when the number of the activation OAM cells accepted at the point A exceeds 128, the notification of reception of activation OAM cells to the CPU 13 of the point A is suspended. By this, the load of the CPU 13 can be reduced.

Namely, the permissible number managing unit 21 in the point A continuously manages the permissible number which is, on one hand, incremented by the number of the performance monitoring OAM cells generated containing an "Activation Request" representing a request for starting the monitoring of performance from the opposing ATM exchange 1, for example, the point D, and which is, on the other hand, decremented by the number of the performance monitoring OAM cells generated containing a "Deactivation Request" representing a request for suspending the monitoring of performance. The unit 21 restricts the activation of the monitoring of performance by the processor 13 when that permissible number exceeds a predetermined threshold.

Figure 12:
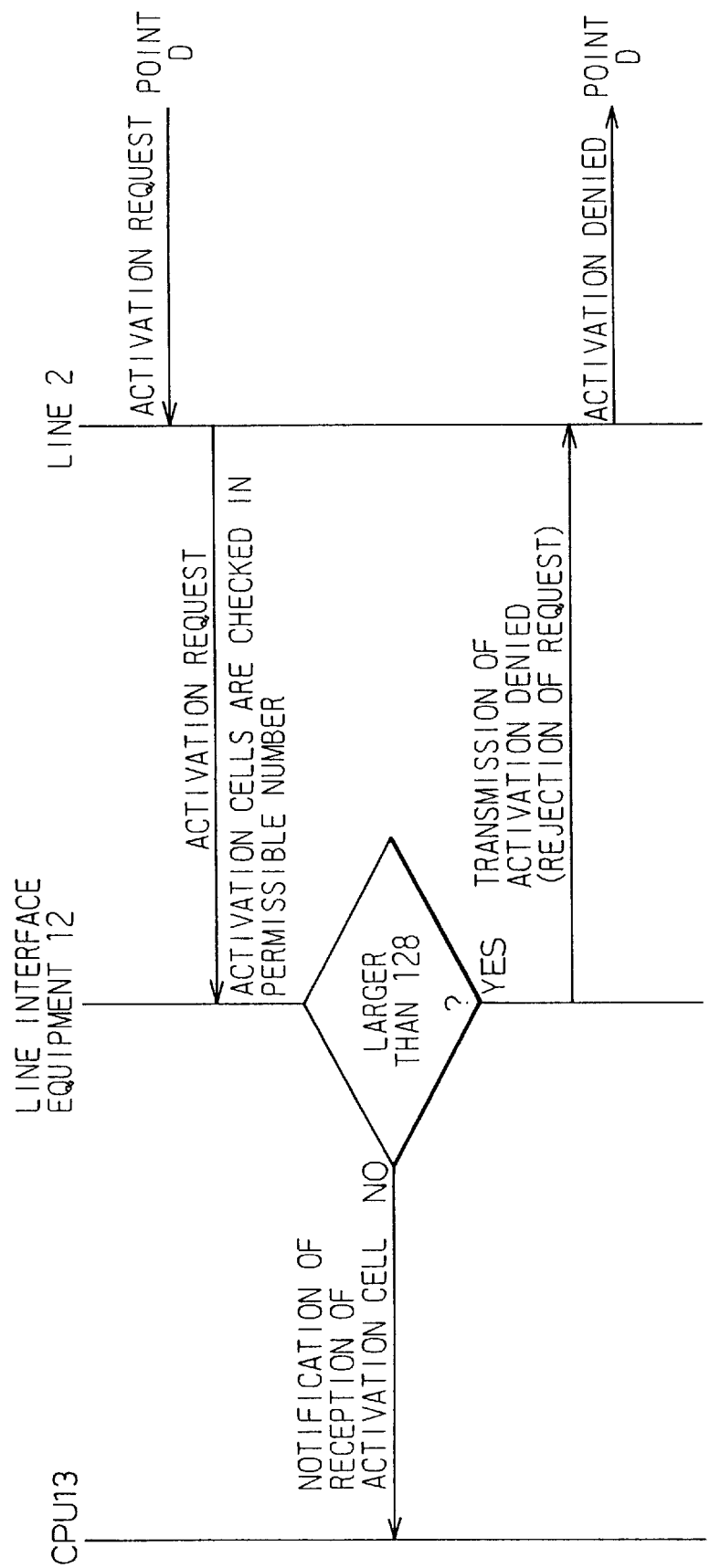
FIG. 12 is a sequence diagram of an operation for restricting the activation by the processor for monitoring the performance.

FIG. 12 is a sequence diagram of the operation for restricting the activation of the monitoring of performance by the processor.

Assume that an OAM cell 4 containing an "Activation Request" (activation cell) is transmitted from the opposing ATM exchange (for example, point D) to the lines 2 and received at the line interface equipment 12.

The equipment 12 checks the permissible number of activation cells. If that number is larger than the predetermined threshold (for example, 128), this would overload the processor (CPU) 13, therefore an OAM cell 4 containing an "Activation Denied" is transmitted via the lines 2 to the point D.

If the permissible number of the activation cells is checked and the number is smaller than 128, the CPU 13 can process the cells, so the equipment 12 notifies the CPU 13 to receive the activation cells.

Figure 13:
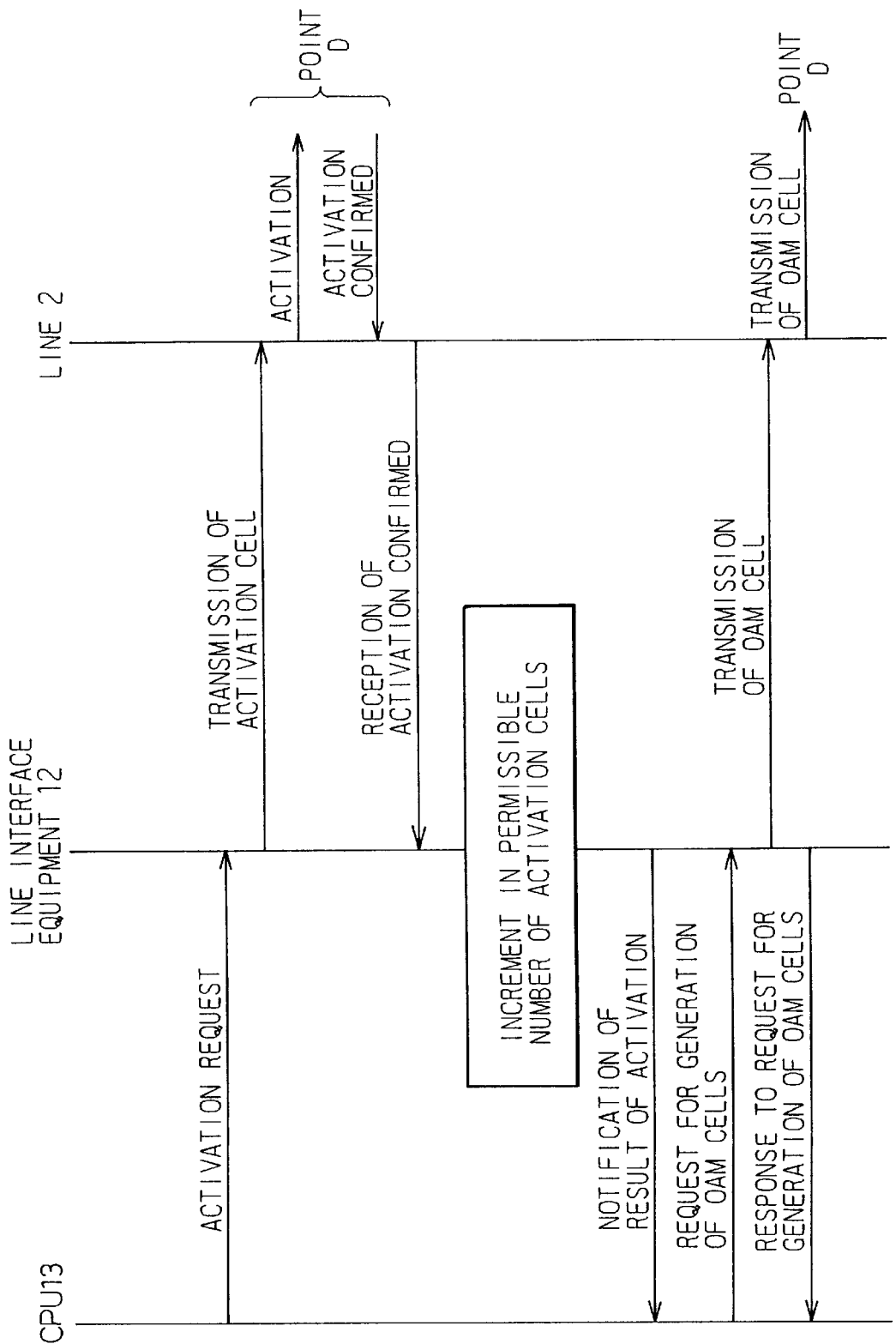
FIG. 13 is a sequence diagram of the operation for incrementing the permissible number of activation cells.

FIG. 13 is a sequence diagram of the operation for incrementing the permissible number of the activation cells. An "Activation Request" is sometimes sent from an opposing ATM exchange 1 and sometimes sent from one's self (point A). In this figure, an example where the point A sends the request is shown.

When an "Activation Request" indicating a request of start of monitoring is sent to the line interface equipment 12 in the point A from the CPU 13 in the point A, that request is sent to the point D via the lines 2 as an OAM cell 4 containing an "Activation Request" (activation cell).

In response to this, the point D returns an "Activation Confirmed". This is received at the equipment 12 which then increments the permissible number of the activation cells. Simultaneously with this, the activation result indicating that the "Activation Request" has been accepted is notified to the CPU 13.

Thereafter, the CPU 13 requests the generation of a performance monitoring OAM cell to the equipment 12. In response to this, the equipment 12 sends the performance monitoring OAM cell to the point D via the lines 2. When succeeding in the transmission of this cell, the equipment 12 returns to the CPU 13 a response to the request for the generation of the performance monitoring OAM cell from the CPU 13.

Figure 14:
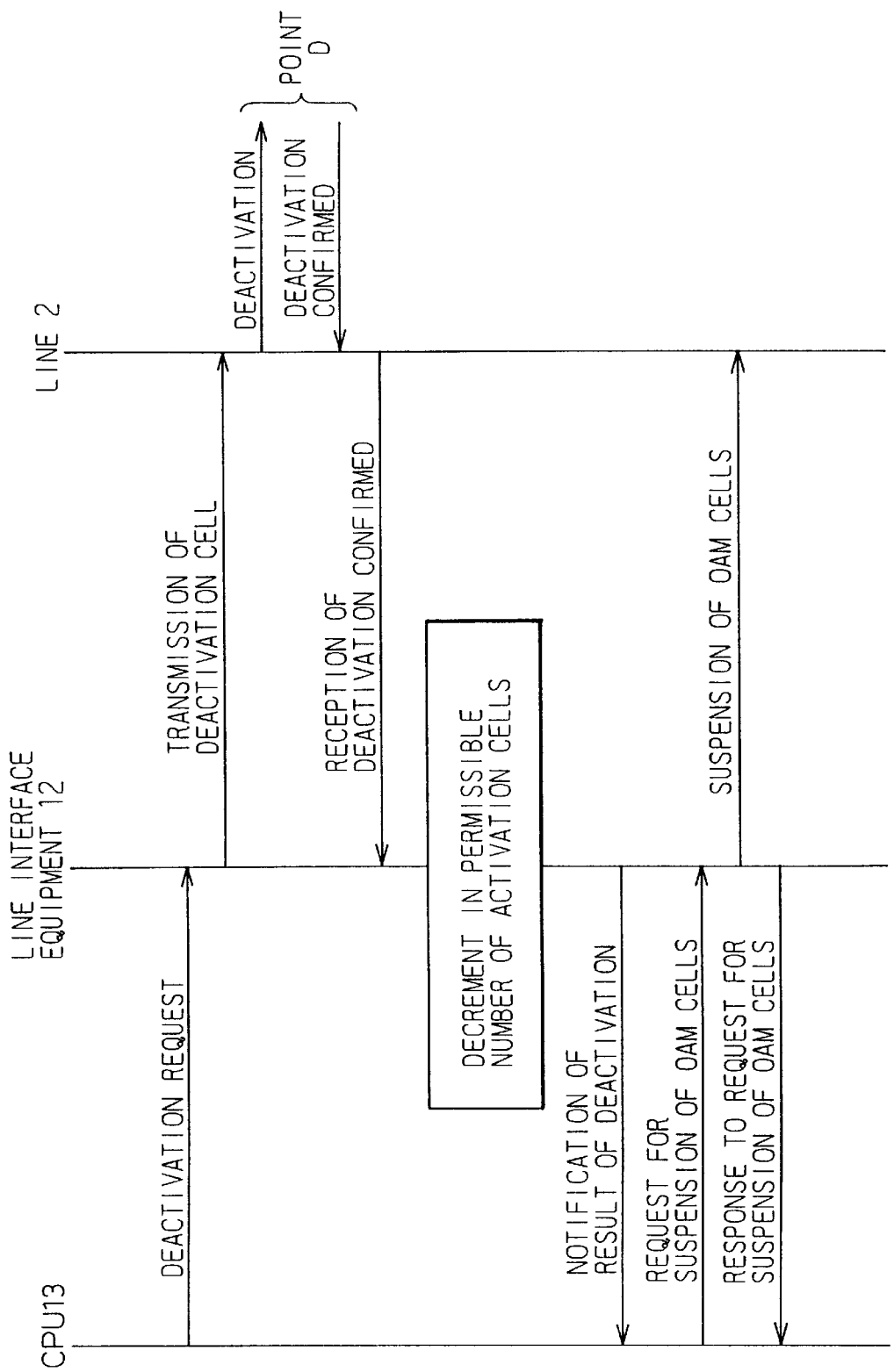
FIG. 14 is a sequence diagram of the operation for decrementing the permissible number of activation cells.

FIG. 14 is a sequence diagram of the operation for decrementing the permissible number of activation cells.

When a "Deactivation Request" indicating a request for suspension of monitoring is sent from the CPU 13 in the point A to the line interface equipment 12 in the point A, that request is sent to the point D via the lines 2 as an OAM cell 4 containing a "Deactivation Request" (deactivation cell).

In response to this, the point D returns a "Deactivation Confirmed". This is received at the equipment 12 which then decrements the permissible number of the activation cells. Simultaneously with this, a deactivation result indicating that the "Deactivation Request" has been accepted is notified to the CPU 13.

Thereafter, the CPU 13 requests the suspension of generation of the performance monitoring OAM cells to the equipment 12, and the equipment 12 suspends the transmission of the cells to the lines 2. When the suspension of transmission of the cells is completed, a response to the request for suspension of generation of the performance monitoring OAM cells from the CPU 13 is returned to the CPU 13.

Note that, the main components in FIGS. 11A and 11B which relate to the operations represented in FIG. 12, FIG. 13, and FIG. 14 are as follows. First, when viewing the CPU 13 in these figures, the control unit 37 and the interface unit 38 in the CPU 13 shown in FIG. 11A are relevant.

Further, when viewing the line interface equipment 12 in FIG. 12 to FIG. 14, the permissible number managing unit 21 in the equipment 12 shown in FIG. 11B at first and the control unit 28 and the interface units 29 and 30 are relevant.

EXAMPLE 2

This example mainly relates to the functions of the timing control unit 22 in FIG. 11B. The autonomous control by the state managing unit 20 can be made more efficient by the control unit 22. Namely, the timing control unit 22 sets the timer when receiving an "Activation Request" from the processor (CPU) 13, and monitors a predetermined time from when it transmits an OAM cell containing this "Activation Request" to the opposing ATM exchange to when an "Activation Confirmed" which is the response thereof is returned. According to the above monitor, on one hand, the unit 22 releases the timer when "Activation Confirmed" is not returned and the time continues to run out even if a predetermined number of reattempts are made, and, on the other hand, releases the timer when the "Activation Confirmed" is returned as well.

Figure 15:
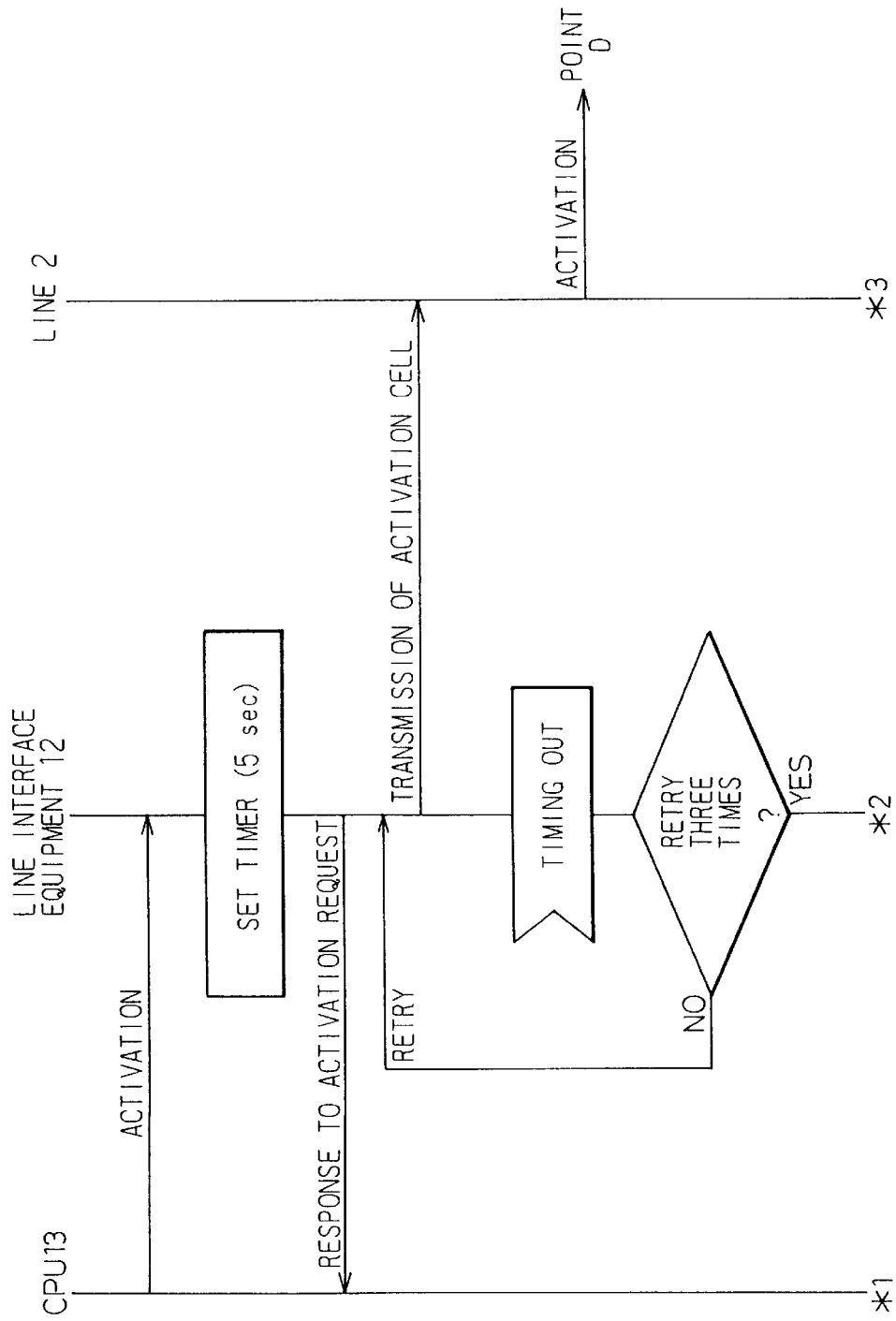
FIG. 15 is part one of a sequence diagram of the operation of a timing control unit 22.
Figure 16:
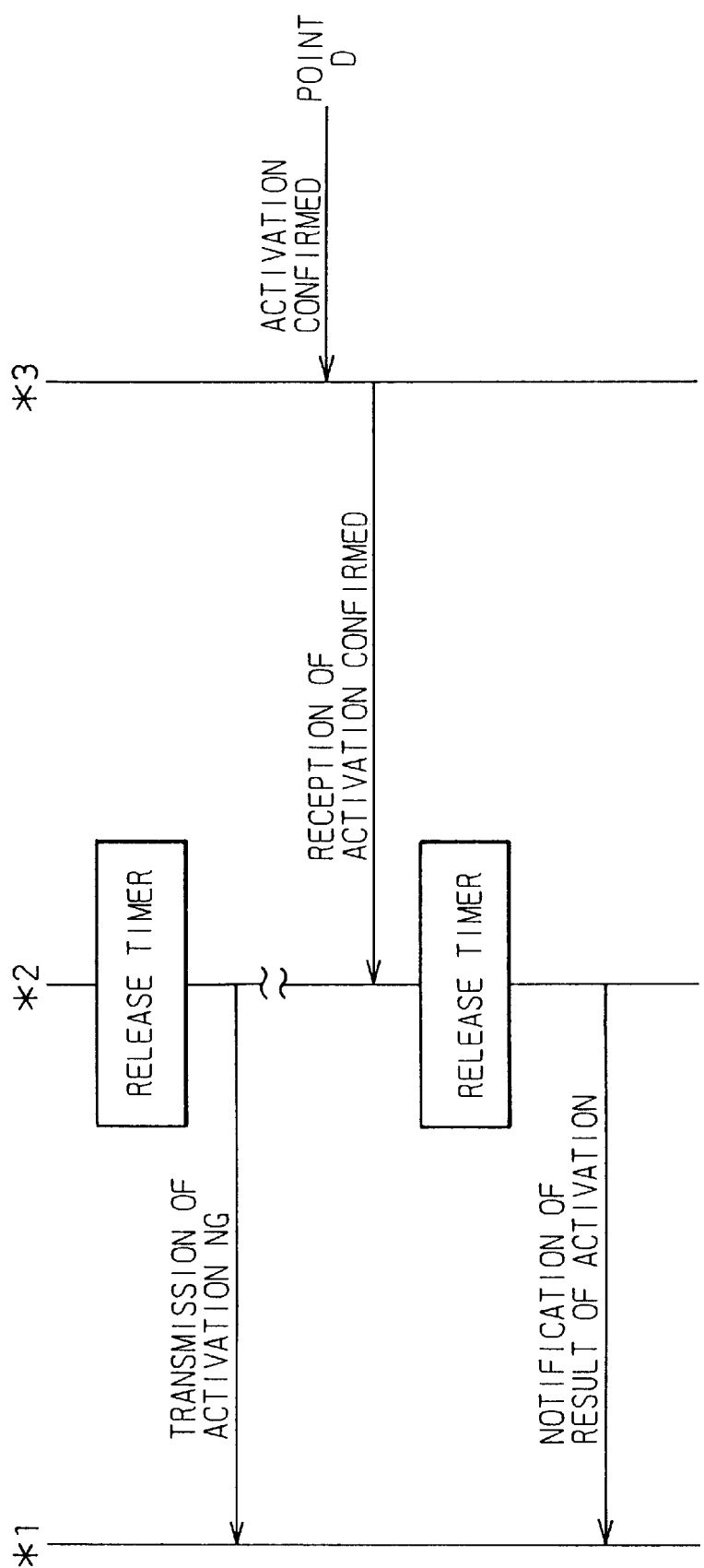
FIG. 16 is part two of a sequence diagram of the operation of the timing control unit 22.

FIG. 15 and FIG. 16 show a first and second part of a sequence diagram of the operation of the timing control unit 22.

In FIG. 15, assume that the CPU 13 issues an "Activation Request" (left top of the figure). The line interface equipment 12 receiving this sets the timer. The time set is for example five seconds. Simultaneously with this, the response to the "Activation Request" is returned to the CPU 13. Then, an OAM cell containing the "Activation Request" (activation cell) is transmitted to the point D via the lines 2.

However, when not able to receive an "Activation Confirmed", that is, a response responding to that "Activation Request" from the point D even if the equipment 12 waits for that five seconds, the time runs out (TIMING OUT).

Therefore, a similar operation is repeated again (RETRY). The number of retries is set to for example three times. If three times are exceeded (YES), the previously set timer is released (RELEASE TIMER of FIG. 16). Accordingly, a "NG" indicating the failure of activation is transmitted to the CPU 13.

The timer is also released in the normal state where an "Activation Confirmed" is transmitted from the point D as shown in FIG. 16. At this time, the result of the activation (OK) is notified to the CPU 13.

Note that, the main components of FIGS. 11A and 11B relating to the operation represented in FIG. 15 and FIG. 16 are as follows. For the CPU 13, they are the control unit 37, the interface unit 38, and the monitoring state reading unit 34. For the line interface equipment 12, other than the timing control unit 22, they are the control unit 28 and the interface unit 29.

EXAMPLE 3

This example mainly relates to the functions of the backward reporting control unit 23 in FIG. 11B. The control unit 23 enables the autonomous control by the state managing unit 20 mentioned before to be made more efficient. Namely, the backward reporting control unit 23 has a flag F indicating the information of whether the information concerning the monitoring of the performance is to be transmitted to the opposing ATM exchange as the backward reporting information ("1") or not ("0"), monitors this flag F, autonomously generates a "Backward Reporting" when the flag F is "1", and transmits this reporting to the opposing ATM exchange.

Figure 17:
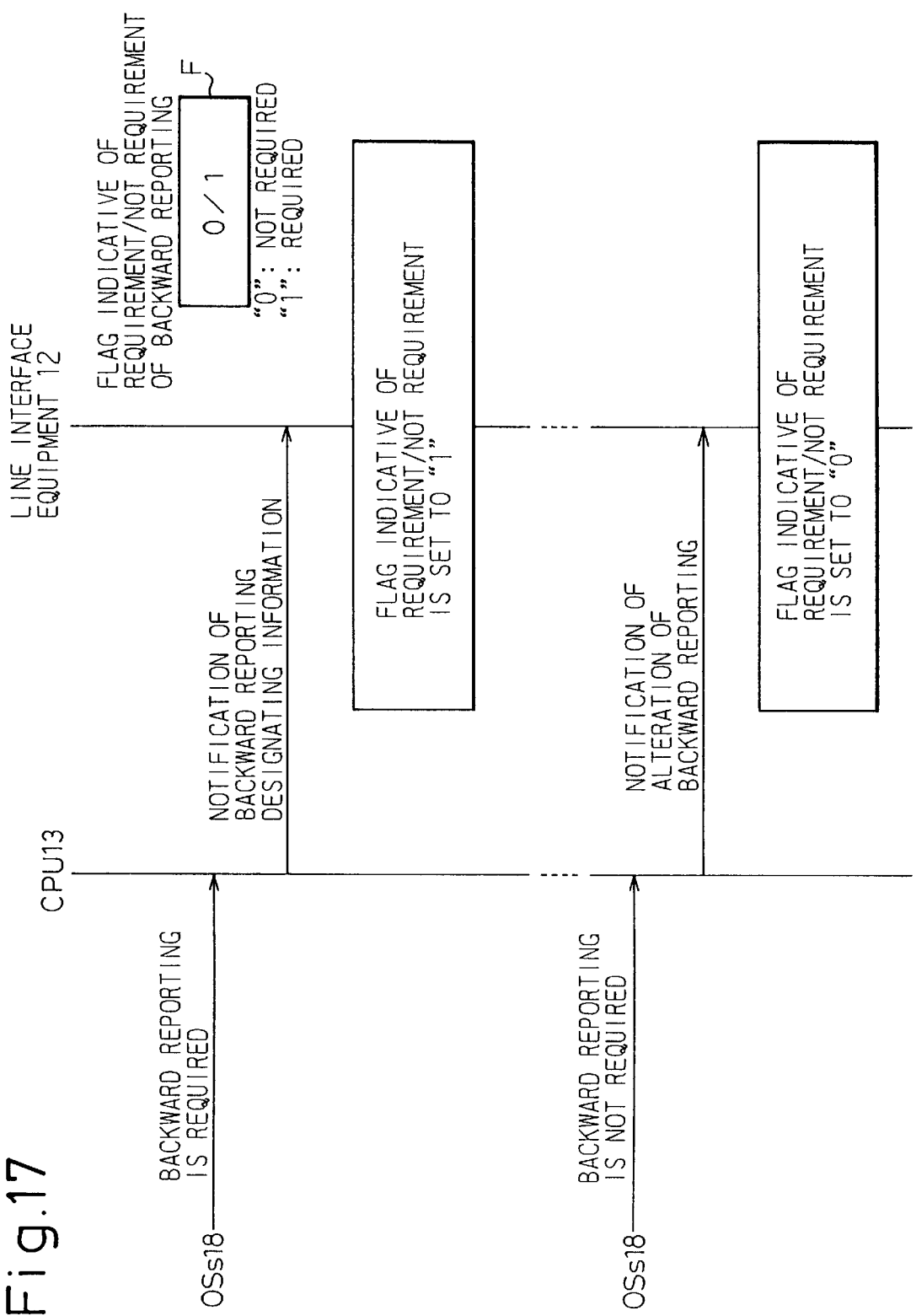
FIG. 17 is a sequence diagram of the operation for setting a flag in a backward reporting control unit 23.

FIG. 17 is a sequence diagram of the operation for setting the flag in the backward reporting unit 23. Further, FIG. 18 is a sequence diagram of the operation according to the flag information in the backward reporting control unit 23.

Referring to FIG. 17, an instruction that backward reporting is required is input from for example the central management center OSs 18 (or from the console 15) (left top in the figure) to the CPU 13. The CPU 13 sends this instruction to the line interface equipment 12. Here, "1" is set in the flag F in the backward reporting control unit 23.

Conversely, when an instruction that backward reporting is not required is input from the OSs 18, this reporting is sent to the line interface equipment 12 via the CPU 13, and the flag F is set to "0".

Figure 18:
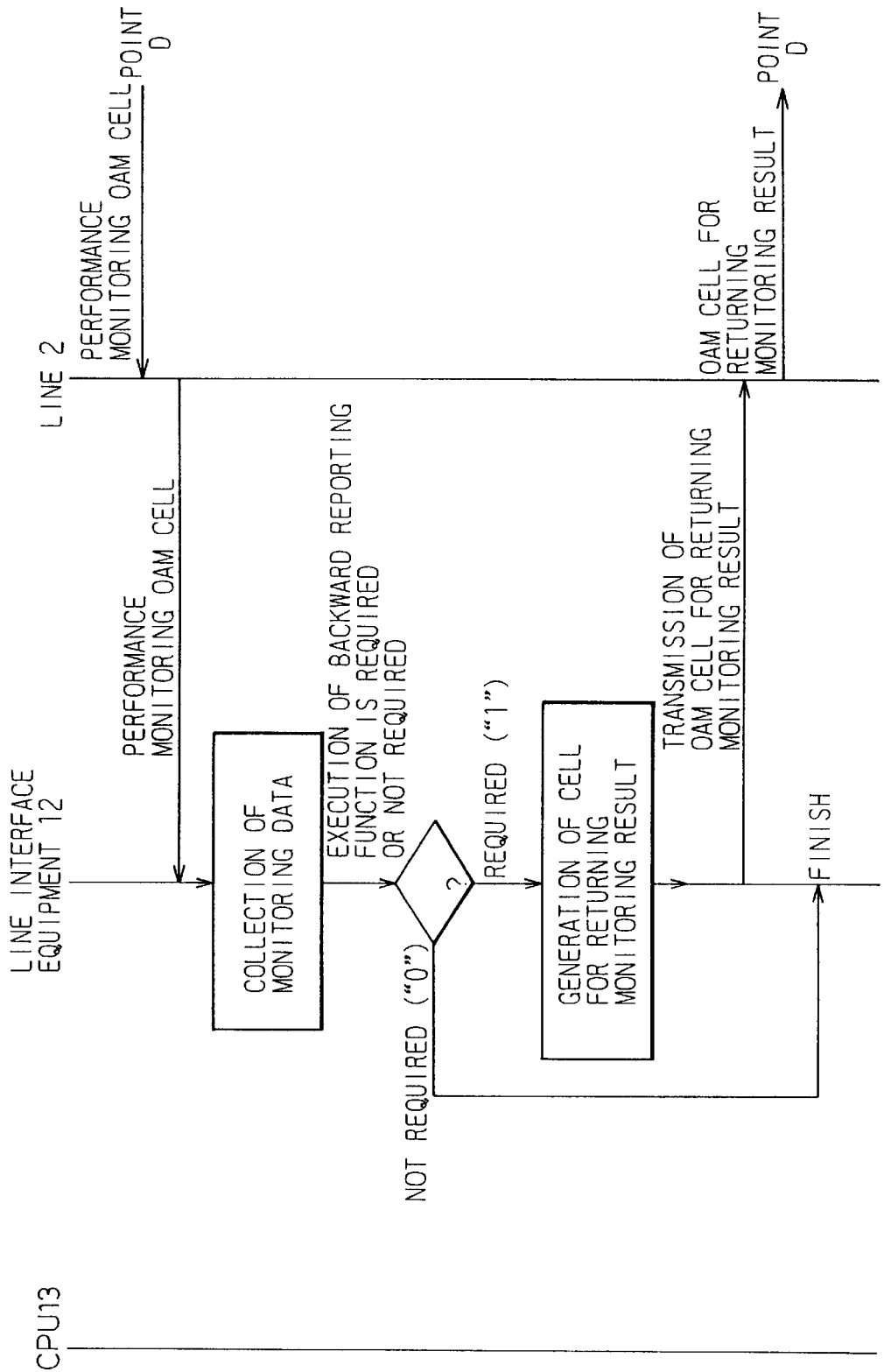
FIG. 18 is a sequence diagram of the operation performed based on the flag information in the backward reporting control unit 23.

Next, FIG. 18 will be referred to. Assume that a performance monitoring OAM cell 4 is transmitted from the point D (right top of the figure). This OAM cell 4 is received at the line interface equipment 12 via the lines 2. The equipment 12 collects the monitoring data based on the content of the cell 4.

Thereafter, the flag F is referred to so as to check whether or not the backward reporting is required. When the flag F is "1", an OAM cell 4 containing the result of monitoring at the point A is generated and is returned to the point D via the lines 2. The CPU 13 is not concerned at all for this autonomous operation.

Note that the main components of FIG. 11 relating to the operation represented in FIG. 17 and FIG. 18 are the components 34, 35, 36, 37, and 38 shown in FIGS. 11A and 11B for the CPU 13 and the components 28 and 12 in addition to the backward reporting control unit 23 for the line interface equipment 12.

EXAMPLE 4

This example mainly relates to the functions of the point code managing unit 26 in FIG. 11B. The autonomous control by the state managing unit 20 can be made more efficient by the managing unit 26. Namely, the point code managing unit 26 internally holds the point identification code CD indicating whether that point is in the ready state where it is idle (0); whether the point is a request originating point originating an "Activation Request" (1); or whether the point is a request receiving point receiving an "Activation Request" (2). By this, an autonomous operation can be carried out at each point without inquiry to the CPU 13.

FIG. 19 to FIG. 22 are parts of a view of the process of setting the point identification code.

Figure 19:
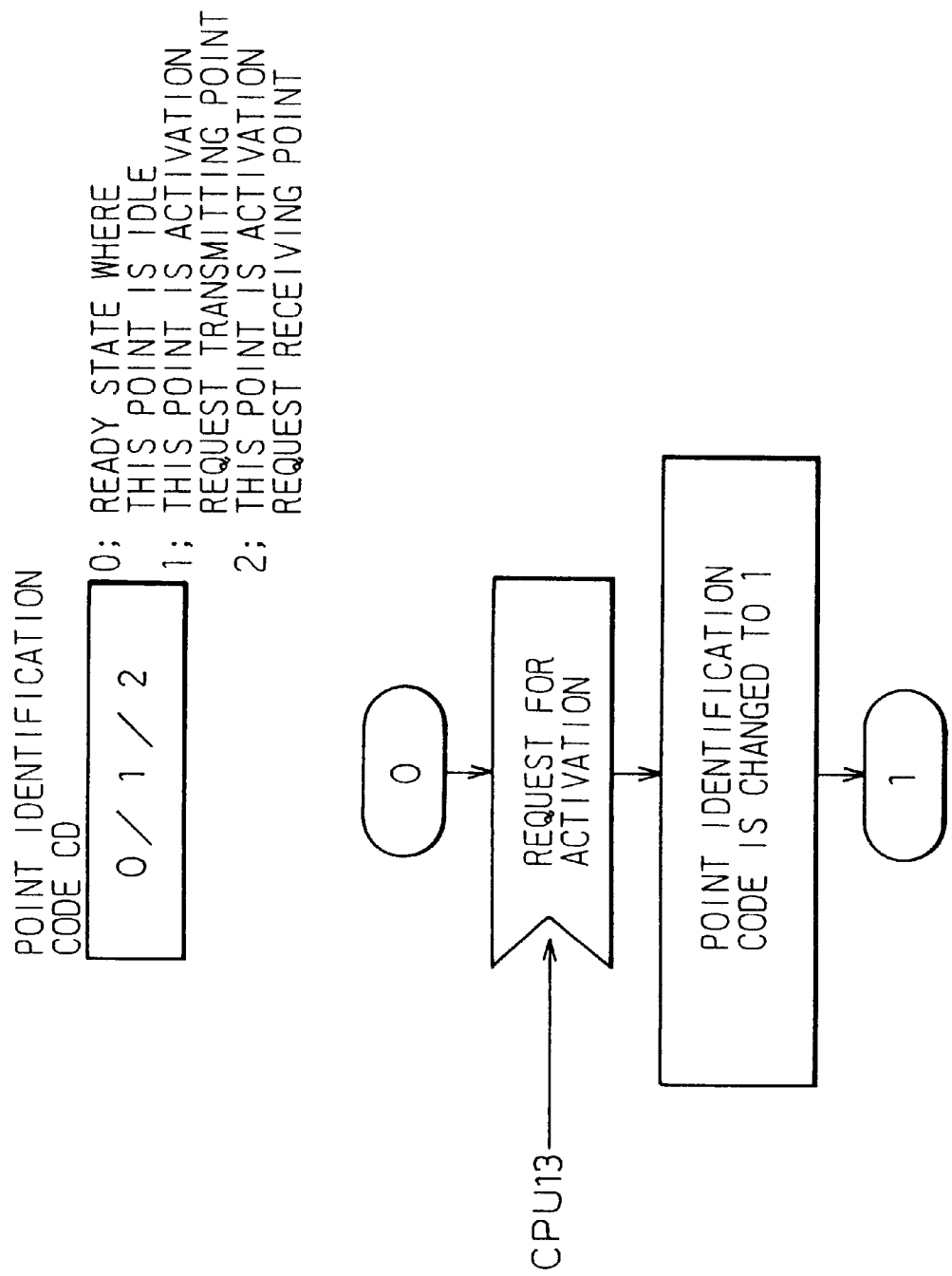
FIG. 19 is part one of a view of the step of setting a point identification code.

Referring to FIG. 19, the point identification code CD and the content thereof are shown at the top of the figure.

When the CPU 13 issues an "Activation Request", the code CD is changed from 0 to 1.

Figure 20:
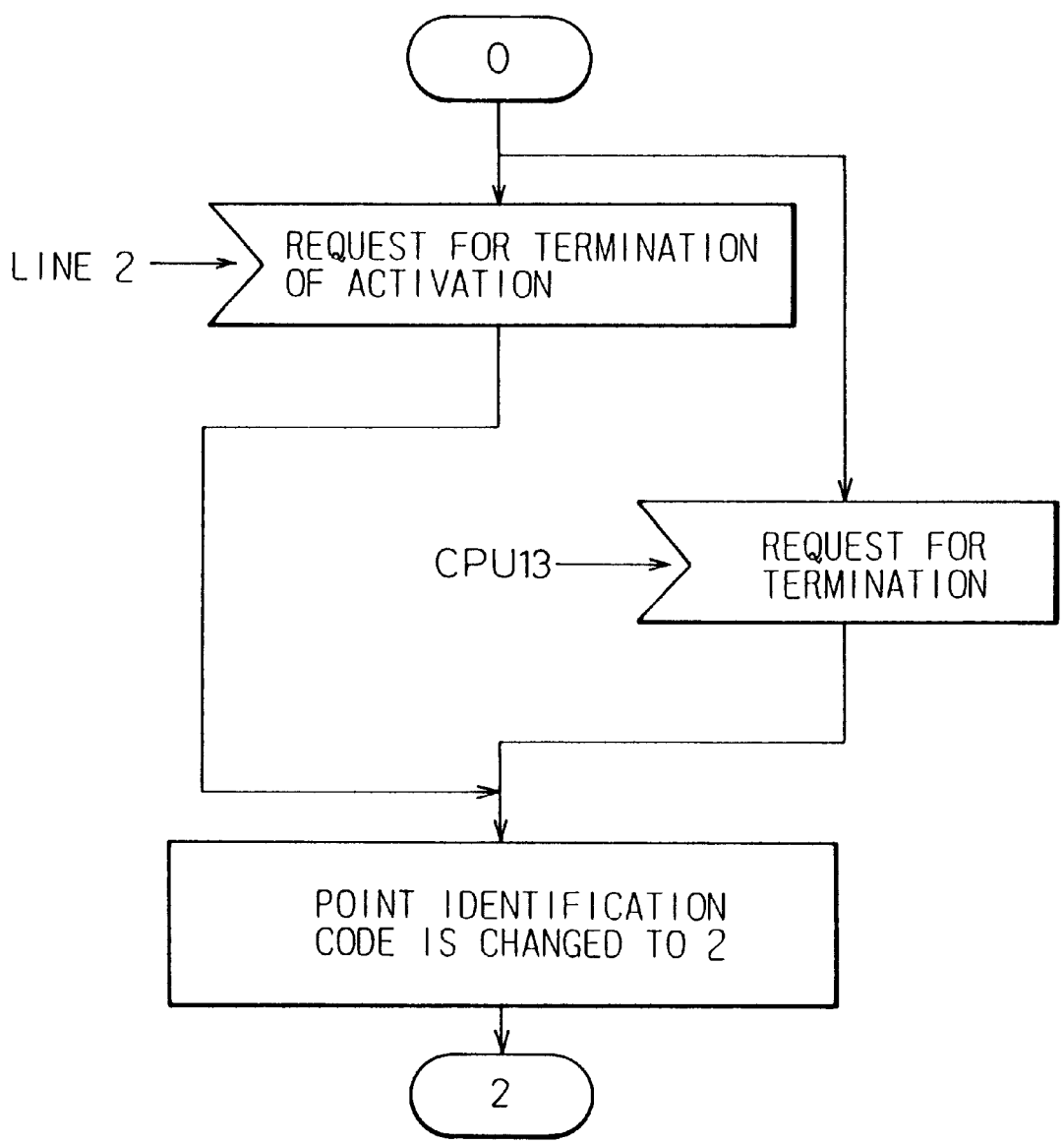
FIG. 20 is part two of a view of the step of setting a point identification code.

Referring to FIG. 20, when for example there is a request for termination of activation from the point D to the point A via the lines 2 (the point A becomes the reception point) or when the CPU 13 of the point A issues a request for termination of activation, the code CD is changed from 0 to 2.

Figure 21:
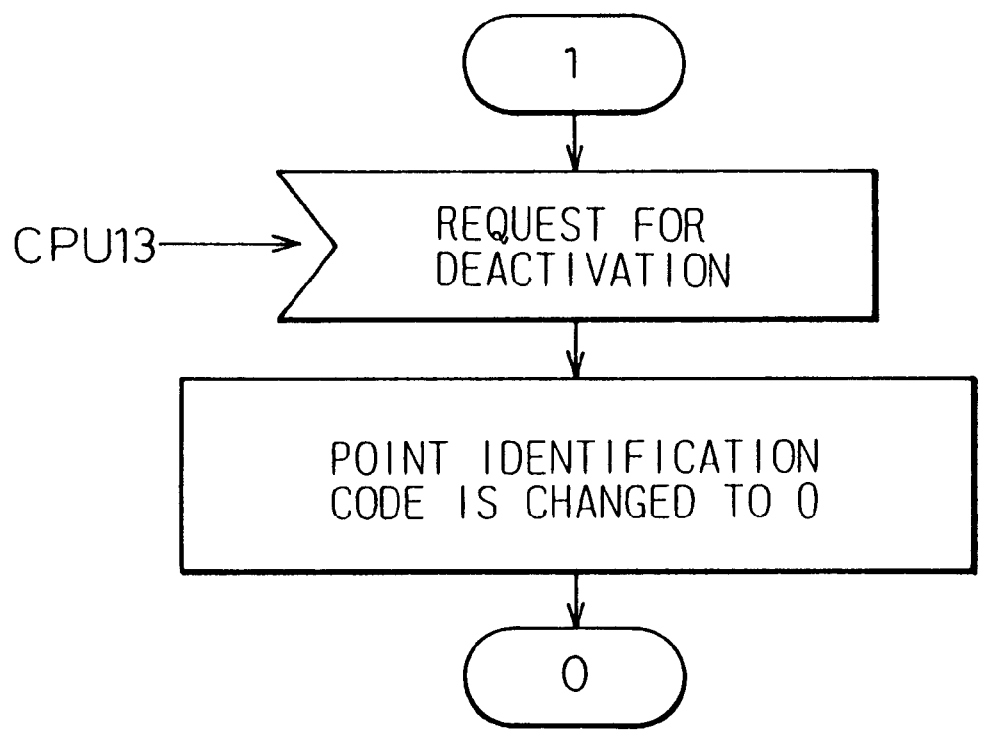
FIG. 21 is part three of a view of the step of setting a point identification code.

Referring to FIG. 21, when the CPU 13 of the point A (same also for the point D) issues a "Deactivation Request", the code CD is changed from 1 to 0.

Figure 22:
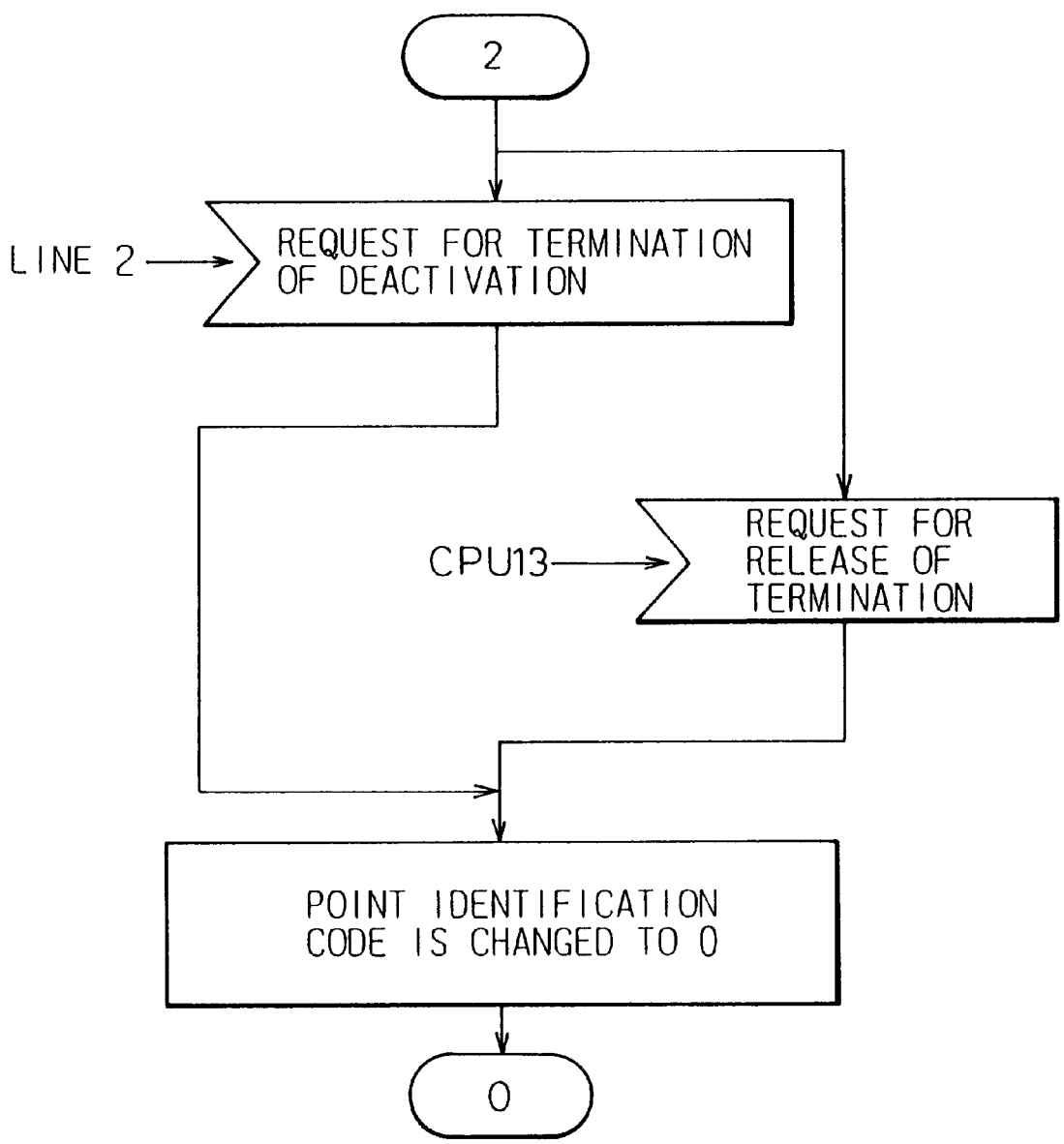
FIG. 22 is part four of a view of the step of setting a point identification code.

Referring to FIG. 22, when for example a request for termination of deactivation is issued from the point D to the point A via the lines 2 (the point A becomes the reception point) or when the CPU 13 of the point A issues a request for release of termination of deactivation, the code CD is changed from 2 to 1. Note that, when the code is 2, the data of various monitorings is collected upon the arrival of the performance monitoring OAM cell 4, and when backward reporting is required (FIG. 18), an OAM cell for returning the monitoring result is autonomously generated and returned.

Note that, the main components of FIG. 11B relating to the operation represented in FIG. 19 to FIG. 22 are the components 28, 29, 34, etc. in addition to the point code managing unit 26.

EXAMPLE 5

This example mainly relates to the functions of the monitoring state managing unit 27 in FIG. 11B. The autonomous control by the state managing unit 20 can be made more efficient by the managing unit 27. Namely, in the monitoring state managing unit 27, when an "Activation Request" is issued from the CPU 13 and this request is received by the line interface equipment 12, the operation after this is autonomously carried out by the line interface equipment 12.

In this case, the equipment 12 performs the timer processing and retry operation with respect to the line 2 side and operates so that the "Activation Request" is reliably transferred to the opposing point D.

When the retries fail at this time and in the worse case where it becomes impossible to notify the failure of retries to the CPU 13 (occurrence of so-called deadlock), the CPU 13 can no longer proceed with the processing while originating the previous "Activation Request".

So as to cope with such a situation, the above timing control unit 31 is provided in the CPU 13. This timing control unit 31 sets the timer when the CPU 13 issues an "Activation Request", decides that the request regarding the "Activation Request" has not been accepted when detecting that time has run out at the line interface equipment 12 after an elapse of a time sufficient for executing the predetermined processing for the opposing ATM exchange upon receipt of that "Activation Request", and starts the processing for dealing with the above decision that the request has not been accepted.

Figure 23:
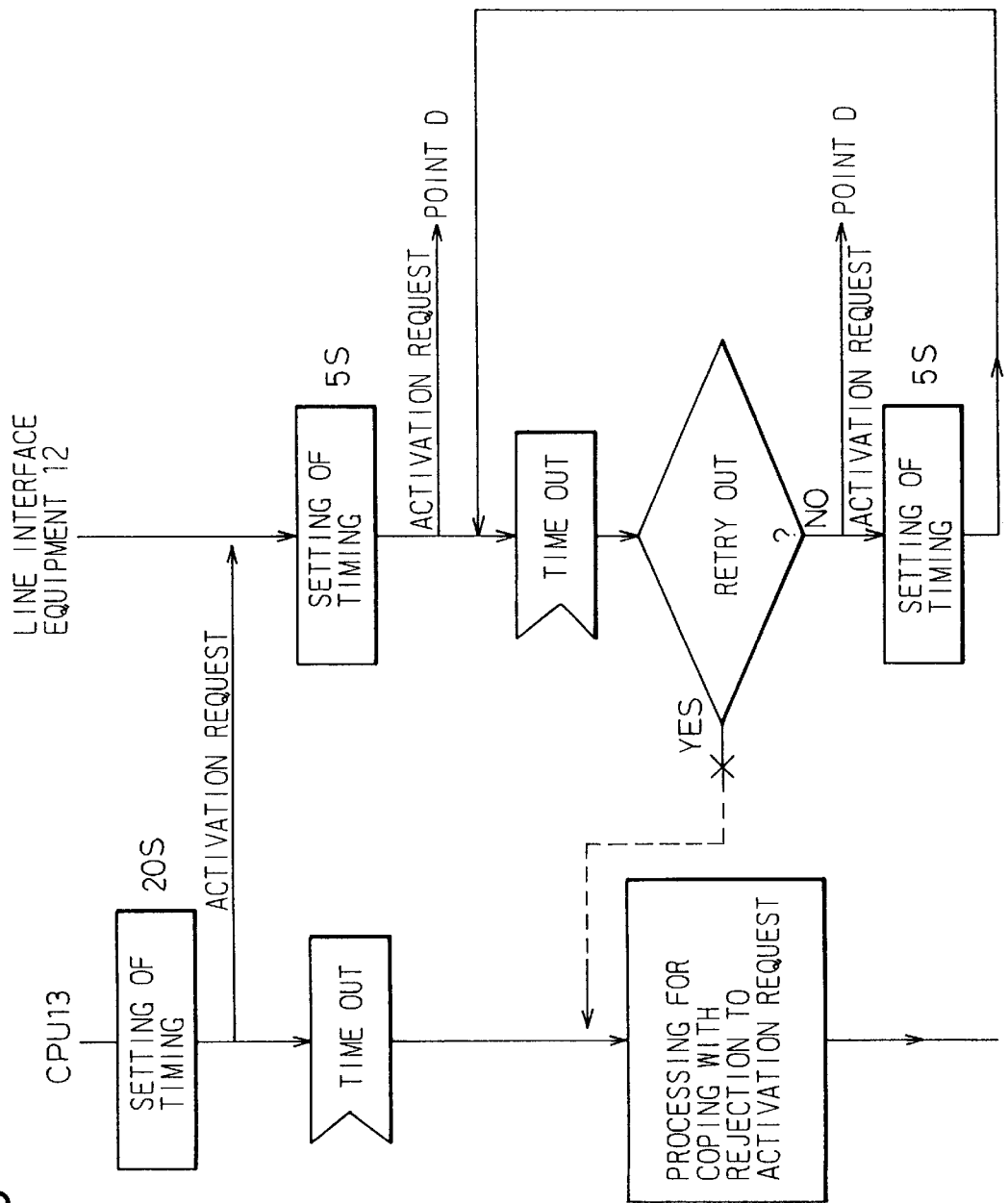
FIG. 23 is a sequence diagram for explaining the operation of a timing control unit 31.

FIG. 23 is a sequence diagram for explaining the operation of the timing control unit 31. In the figure, when the CPU 13 issues an "Activation Request", the timing control unit 31 first sets the timer (SETTING OF TIMING). This timer time is a time sufficient for the line interface equipment 12 to complete a series of operations in response to the "Activation Request", for example, 20 seconds (s).

Subsequently, the "Activation Request" is supplied to the line interface equipment 12. The equipment 12 sets the timer when starting the operation corresponding to this supplied request. This timer time is for example 5 seconds (s), and the activation cell is transmitted to the point D immediately after this. Here, if there is no response from the point D and the timer has run out of time, the retry starts.

Assume that this retry fails and thus entering into a retry out. Here, assume that notification to the CPU 13 becomes impossible at the point indicated by an x mark in the figure.

On the CPU 13 side, the timer, set to 20 seconds, runs out of time due to no notification to the CPU 13.

Thereafter, the CPU 13 executes processing for dealing with the rejection of the "Activation Request".

Note that, the main components of FIGS. 11A and 11B relating to the operation represented in FIG. 23, other than the above timing control unit 31, are the components 12, 22, 28, 29, 31, 34, 37, 38, etc.

EXAMPLE 6

This example mainly relates to the functions of the monitoring state managing unit 27 and the monitoring state reading unit 34 in FIGS. 11A and 11B. These enable the autonomous control by the state managing unit 20 to be made more efficient. Namely, the monitoring state managing unit 27 and the monitoring state reading unit 34 operate as follows. In the above examples, when the timing control unit 31 in the CPU 13 detects that the time has run out, the monitoring state reading unit 34 in the CPU 13 inquires the monitoring state managing unit 27 of the line interface equipment 12 in which state the equipment 12 is, and receives the notification of the state from the managing unit 27. If the notified state is the state of waiting for the "Activation Confirmed" from the opposing ATM exchange, the "Activation Request" is issued again. Conversely, if that state is not the state of waiting for the "Activation Confirmed", it is considered that the timer set by the timing control unit 31 ran out of time and the necessary processing therefor is started.

Figure 24:
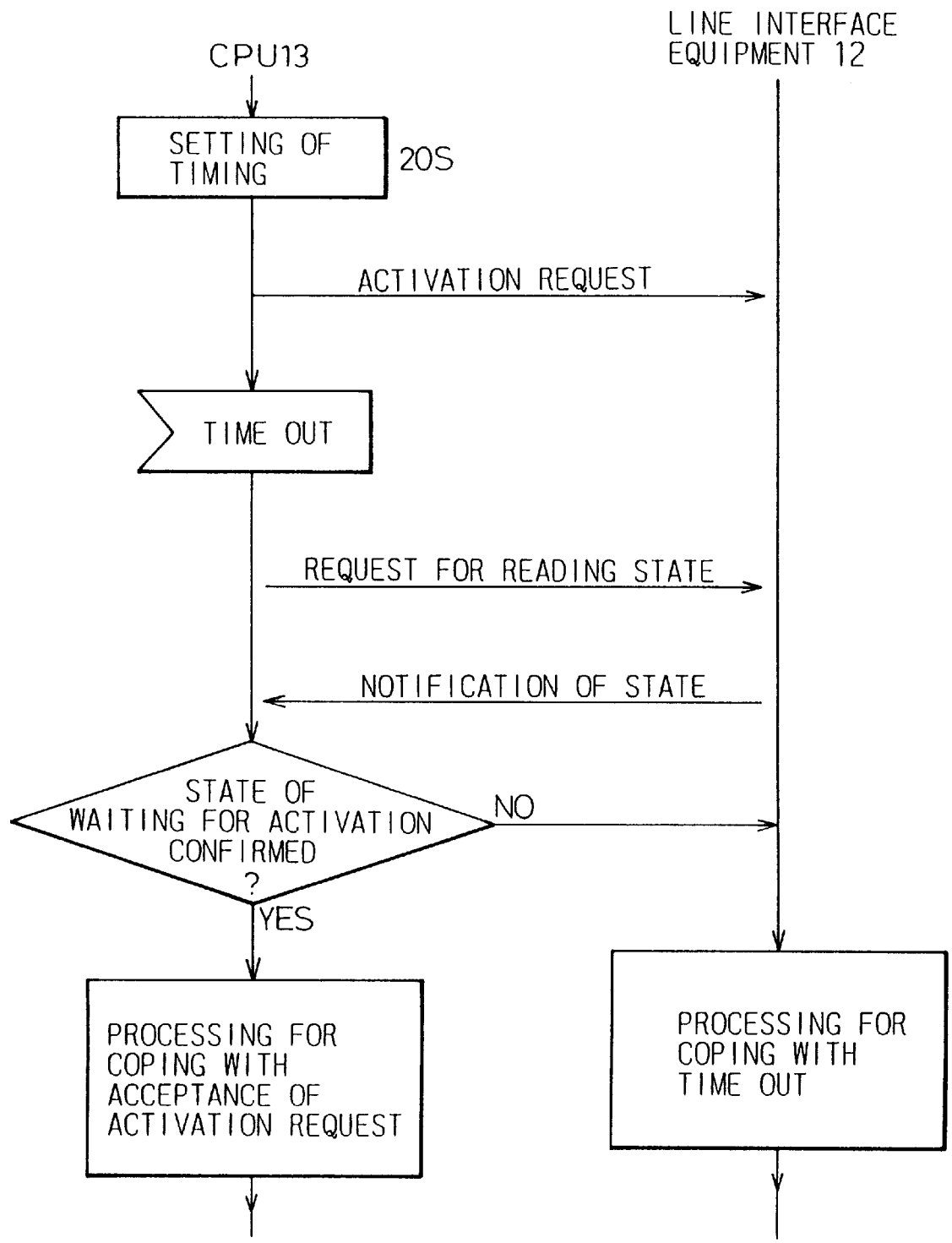
FIG. 24 is a sequence diagram mainly showing the operation of a monitoring state managing unit 27 and a monitoring state reading unit 34.

FIG. 24 is a sequence diagram mainly representing the operation of the monitoring state managing unit 27 and the monitoring state reading unit 34.

In the figure, the CPU 13 sets for example 20 seconds (s) to the timer (SETTING OF TIMING) and, at the same time, issues an "Activation Request" and notifies the same to the line interface equipment 12. However, assume that the time runs out.

In this state, the monitoring state reading unit 34 of the CPU 13 inquires the monitoring state managing unit 27 of the line interface equipment 12 in which state the equipment 12 is.

If the state when the above inquiry is made is the waiting state of an "Activation Confirmed" from the point D, that "Activation Request" is acceptable and the processing therefor is continued.

If the state when the above inquiry is made is not the waiting state of an "Activation Confirmed" from the point D, it is found that the series of operations starting from that "Activation Request" has been broken off somewhere, and thus the time ran out so that the necessary processing therefor is started.

EXAMPLE 7

As shown in FIG. 30A, for an improvement of reliability, the line interface equipment 12 is duplexed to an active side and standby side corresponding to the active lines (upper side) 2 and the standby lines (lower side) 2.

Here, assume that a failure occurs in the active line interface equipment 12(A) after the "Activation Request" is issued from the CPU 13. In the conventional case, the standby equipment 12(B) is activated in place of this failed active equipment 12(A) and the processing in response to the "Activation Request" is executed again.

In this state, the monitoring of the performance in real time at the point of time when the CPU 13 issues the "Activation Request" no longer can be carried out.

Therefore, in the present example, when the CPU 13 issues an "Activation Request" which commands the start of monitoring of performance, an "Activation Request" is simultaneously supplied to both of the active line interface equipment 12 and the standby line interface equipment 12. When a failure occurs in the active line interface equipment 12, the line interface equipment 12 is immediately switched to the standby one and the monitoring is continued.

By this, even if a failure occurs in the equipment 12, real time monitoring at the time when the request of monitoring is generated can be continued.

Figure 25:
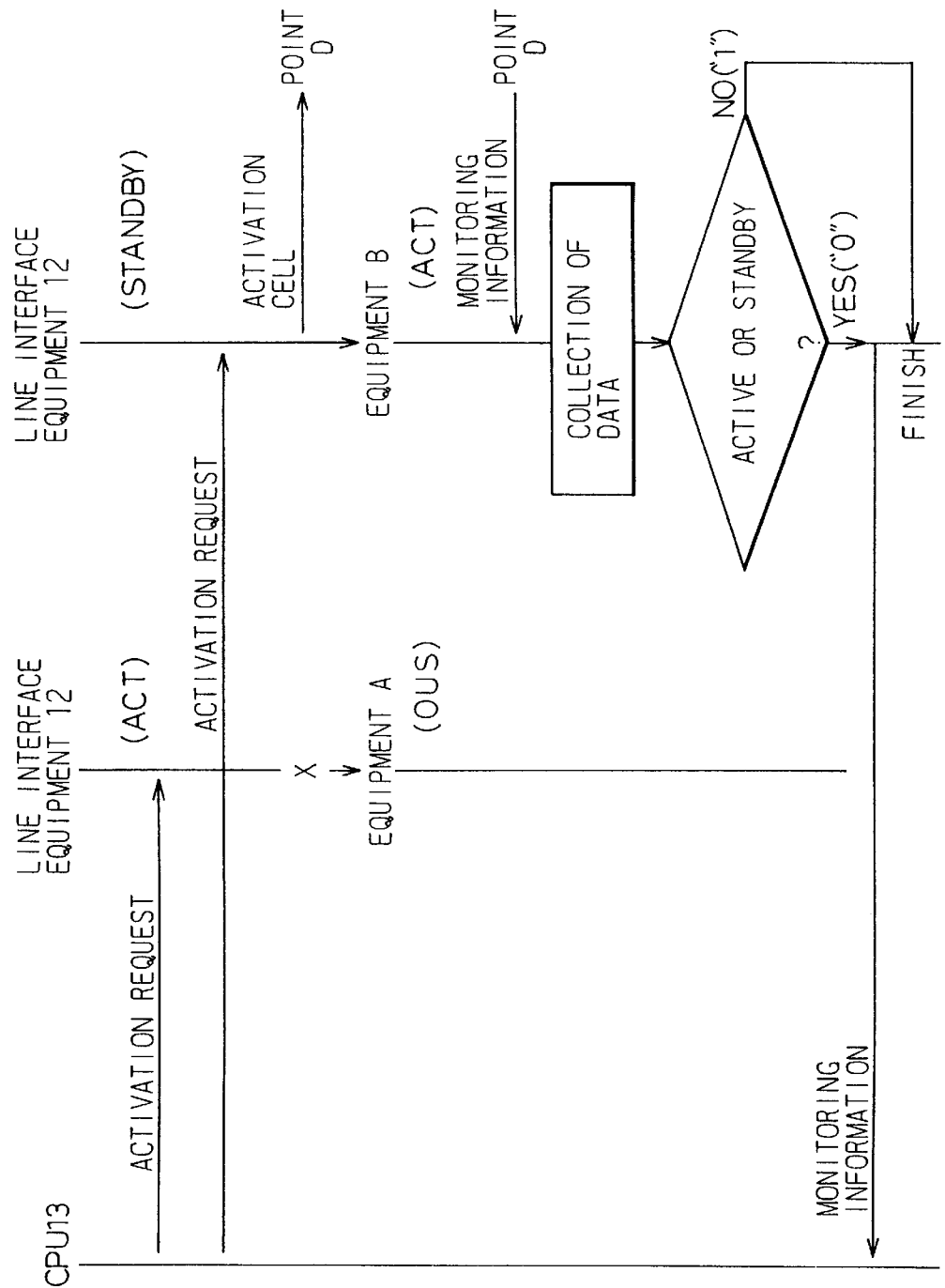
FIG. 25 is a sequence diagram assuming a case where a failure occurs in an active line interface equipment of a duplexed line interface equipment 12.

FIG. 25 is a sequence diagram assuming a case where a failure occurs in the active one of the duplexed line interface equipment 12.

First, assume that the "Activation Request" is issued from the CPU 13 (left top of the figure). In this case, it is a usual procedure to send the "Activation Request" to only the active equipment 12(A).

In the present example, however, the "Activation Request" is simultaneously supplied to not only the active equipment 12(A), but also the standby equipment 12(B). The results thereof are as follows.

Here, assume that a failure (indicated by the mark x in the figure) occurs in the active equipment 12(A). From immediately after this, the equipment 12(A) goes out of service (OUS).

Simultaneously with this, the equipment 12(B) is switched from the standby side to the active side (ACT attached to the equipment B in the figure). In this case, the equipment 12(B) can immediately take over the monitoring which had been performed by the equipment 12(A).

This is because the "Activation Request" from the CPU 13 is also supplied to the equipment 12(B) from the first and exactly the same monitoring data as that by the monitoring which had been performed through the active line 2 is collected by the equipment 12(B). Thus, the "COLLECTION OF DATA" in the figure is started.

A flag indicating whether the equipment is the active side ("0") or standby side ("1") is provided in each of the equipment 12(A) and 12(B). The operation of the equipment is successively determined by that flag. In this example, the flag regarding the equipment 12(B) has been already switched from "1" to "0" after the failure. It is detected that the flag regarding the equipment 12(B) is "0", and the monitoring information containing the collection data is transferred to the CPU 13.

Note that, the main component of FIG. 11B relating to the operation represented in FIG. 25 is the duplex state managing unit 25. Further, the monitoring information collecting unit 24 is relevant.

EXAMPLE 8

Example 8 relates to an adjustment procedure where an "Activation Request" (1) issued from the opposing ATM exchange via the lines 2 and an "Activation Request" (2) instructed from the central management center (OSs) 18 conflict. This adjustment is carried out mainly by the conflict managing unit 32 in the CPU 13 among the components shown in FIG. 11A.

This conflict managing unit 32 sets the conflict prevention flag F' when receiving an "Activation Request" from the opposing exchange and resets the conflict prevention flag F' after an elapse of a predetermined time (t) from when the CPU 13 is notified with the "Activation Request" to when the state changes from the ready state to the state of activation. When the "Activation Request" is notified from the central management center (OSs) 18 managing the entire ATM switching system to the CPU 13 within that predetermined time (t), this request is rejected.

Figure 26:
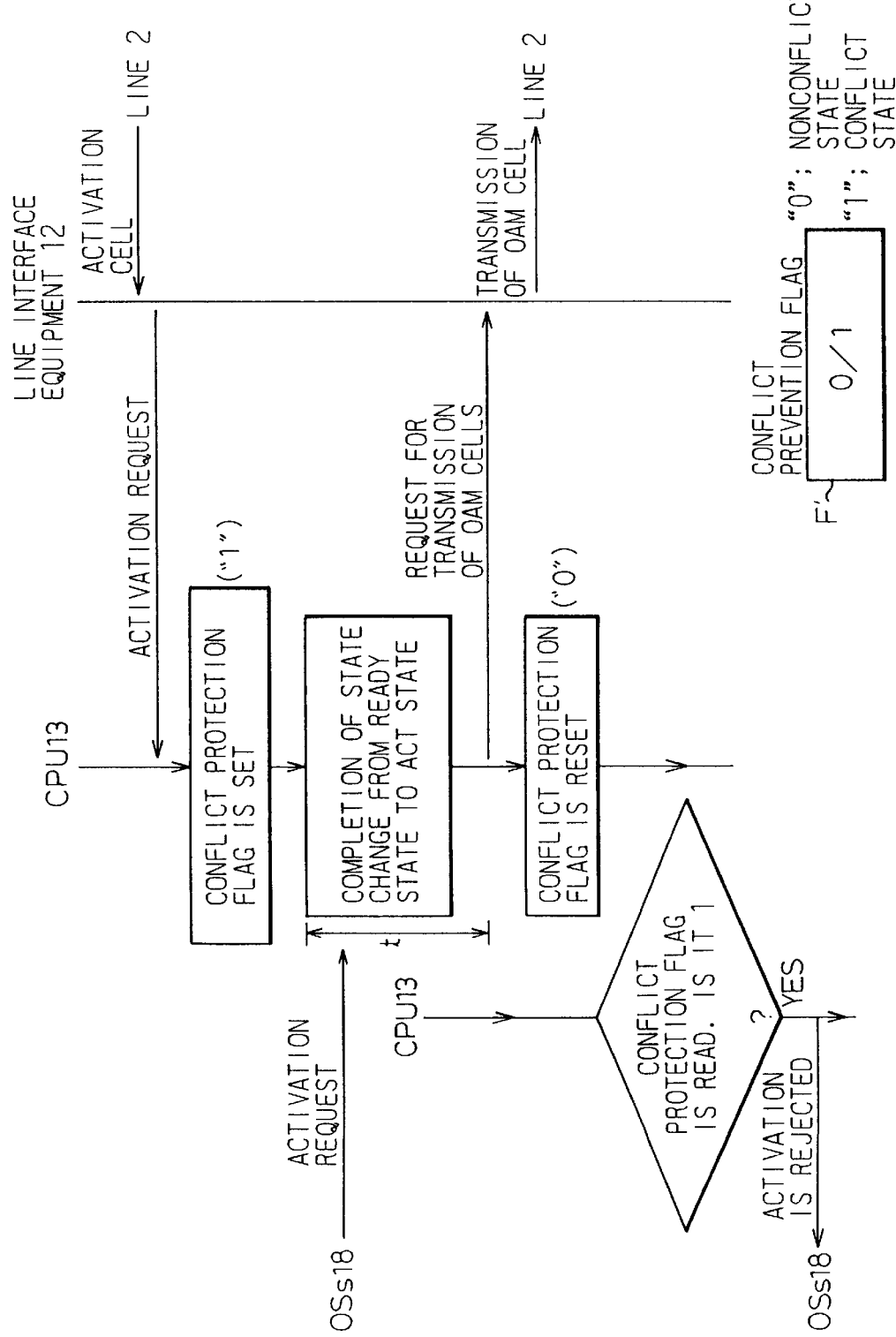
FIG. 26 is a sequence diagram of the operation of a conflict managing unit 32.

FIG. 26 is a sequence diagram of the operation of the conflict managing unit 32. In the figure, when an OAM cell 4 containing an "Activation Request" is transmitted from for example the point D (right top of the figure) via the lines 2, the request is notified to the CPU 13 via the line interface equipment 12.

Here, the conflict managing unit 32 sets the conflict prevention flag F' to "1" as indicated in the right bottom of the figure and then waits for the elapse of the predetermined time (t). This time (t) is a time covering the time required for the change of the CPU 13 from the ready state to the activation state.

After the elapse of this predetermined time t, the CPU 13 issues a request for transmission of a performance monitoring OAM cell to the equipment 12 and further transmits the OAM cell 4 to the lines 2. Alternatively, it transmits a request for transmission of an OAM cell to the opposing point D.

Thereafter, the conflict prevention flag F' is reset to "0".

There is a case where the CPU 13 receives an "Activation Request" also from the OSs 18, but when the reception occurs in the predetermined time (t), this request is rejected. This is because the conflict prevention flag F' has become "1" during this time (t) and it would conflict with other request.

In the conflict of the OSs and lines described above, the priority is given to the lines, because the "Activation Denied" mentioned above can not be rejected by the CPU 13, and therefore the line side is given priority since it may receive a cell containing this "Activation Denied".

Note that, the main component of FIGS. 11A and 11B relating to the operation represented in FIG. 26 is the above conflict managing unit 32. Other than this, the components 28, 29, 34, 35, 36, 37, and 38 are relevant.

As explained above, according to the present invention, at the monitoring of performance, a state managing unit 20 which manages the change of the state in its own exchange is formed in the line interface equipment 12. Therefore, most of the functions of the processor (CPU) 13 can be shared by the line interface equipment 12 while using an extremely cheap interface, so that the load of the processor can be greatly reduced.

What is claimed is:

1. A line interface equipment in an ATM exchange comprising:

an ATM switch inserted into lines which transfer ring operation administration and maintenance (OAM) cells for performance monitoring, a processor which is operative to control at least said ATM switch, and line interface equipment which is attached to said ATM switch and performs the transfer of said cells under management of said processor, where the transfer of said performance monitoring cells is achieved with an opposing ATM exchange via said lines, said line interface equipment including therein a state managing unit which only performs communication of both information concerning the starting and stopping of monitoring of said performance and also information concerning said monitoring, with said processor and by itself manages a changing state of progress of the monitoring of said performance by successively communicating said OAM cells with said opposing ATM exchange after entering into the monitoring state, said state managing unit autonomously executing the monitoring without intervention of said processor, and a permissible number managing unit continuously managing a permissible number which is incremented by the number of generated OAM cells containing an "Activation Request" representing a request of start of monitoring of said performance and which is decremented by the number of generated OAM cells containing a "Deactivation Request" representing a request of suspension of monitoring of said performance and, when the permissible number exceeds the predetermined threshold, restricting the activation of monitoring of said performance to the processor.

2. A line interface equipment according to claim 1, wherein a timing control unit is provided, said timing control unit setting the timer when receiving an "Activation Request" from said processor, monitoring a predetermined time from when an OAM cell containing said "Activation Request" is transmitted to said opposing ATM exchange to when an "Activation Confirmed" which is the response thereto is returned, on one hand, releasing said timer when timeout state caused by no returning of said "Activation Confirmed" still remains even after a predetermined number of retries, and, on the other hand, releasing said timer also when said "Activation Confirmed" is returned.

3. A line interface equipment according to claim 1, wherein a backward reporting control unit is further provided, said backward reporting control unit having a flag (F) indicating the information of whether the information concerning the monitoring of said performance is to be transmitted to said opposing ATM exchange as the backward reporting ("1") or not ("0"), monitoring said flag (F), autonomously generating a "Backward Reporting" when it is "1", and transmitting the same to said opposing ATM exchange.

4. A line interface equipment according to claim 1, wherein a point code managing unit is further provided, said point code managing unit holding a point identification code (CD) indicating whether the point is in the ready state where it is idle (0), whether the point is a request originating point originating the "Activation Request" (1), or whether the point is a request receiving point receiving an "Activation Request" (2).

5. A line interface equipment in an ATM exchange comprising:

an ATM switch inserted into lines which transfer ring operation administration and maintenance (OAM) cells for performance monitoring, a processor which is operative to control at least said ATM switch, and line interface equipment which is attached to said ATM switch and performs the transfer of said cells under management of said processor, where the transfer of said performance monitoring cells is achieved with an opposing ATM exchange via said lines, said line interface equipment including therein a state managing unit which only performs communication of both information concerning the starting and stopping of monitoring of said performance and also information concerning said monitoring, with said processor and by itself manages a changing state of progress of the monitoring of said performance by successively communicating said OAM cells with said opposing ATM exchange after entering into the monitoring state, said state managing unit autonomously executing the monitoring without intervention of said processor, a timing control unit setting the timer when said processor issues an "Activation Request", deciding that the request of the "Activation Request" has not been accepted when detecting that the line interface equipment has run out of time after an elapse of time sufficient for executing the predetermined processing for said opposing ATM exchange upon receipt of said "Activation Request", and starting processing for dealing with the above decision that the request has not been accepted, and a monitoring state managing unit provided in said line interface equipment; the timing control unit and a state reading unit being in said processor; and when said timing control unit in said processor detects that the time has run out, said monitoring state reading unit in said processor inquires the monitoring state managing unit of said line interface equipment in which state said line interface equipment is, receives the notification of the state from said monitoring state managing unit, and when that state is a state of waiting for an "Activation Confirmed", performs the processing considering that a timer set by said timing control unit has run out of time.

6. A line interface equipment according to claim 1, wherein when an "Activation Request" indicating the start of monitoring of said performance is issued from said processor, said "Activation Request" is simultaneously supplied to both of an active line interface equipment and a standby line interface equipment; and when a failure occurs in said active line interface equipment, said standby line interface equipment is immediately switched to and the monitoring is continued.

7. A line interface equipment according to claim 1, wherein a conflict managing unit is further provided in said processor, said conflict managing unit setting a conflict prevention flag (F') when receiving an "Activation Request" from said opposing exchange and, at the same time, resetting said conflict prevention flag (F') after an elapse of a predetermined time (t) from when the CPU is notified with the "Activation Request" to when the state changes from the ready state to the activation state, and rejecting the "Activation Request" when an "Activation Request" is notified from the central management center managing the entire ATM switching system to said processor within that predetermined time (t).

* * * * *